United States Patent [19]
Dutson et al.

[11] Patent Number: 6,164,151
[45] Date of Patent: Dec. 26, 2000

[54] COMPOSITE SELECTOR FORK ARRANGEMENT ADAPTED TO COOPERATE WITH A SELECTOR SLEEVE

[75] Inventors: Brian Joseph Dutson, Astley; Gary Armstrong, Halifax; Michael James William Thompson, Mirfield, all of United Kingdom

[73] Assignee: Valeo Transmission Limited, Yorkshire, United Kingdom

[21] Appl. No.: 09/078,485

[22] Filed: May 14, 1998

[30] Foreign Application Priority Data

May 15, 1997 [GB] United Kingdom ............... 9709845

[51] Int. Cl.[7] ............... F16H 63/32; G05G 3/00
[52] U.S. Cl. ............... 74/473.37; 192/82 R
[58] Field of Search ............... 74/473.37, 473.36; 192/82 R; 29/460

[56] References Cited

U.S. PATENT DOCUMENTS

| | | | |
|---|---|---|---|
| 4,531,623 | 7/1985 | Arai et al. ............... | 192/82 |
| 5,345,837 | 9/1994 | von Kaler et al. . | |

FOREIGN PATENT DOCUMENTS

| | | |
|---|---|---|
| 54-144580 | 11/1979 | Japan . |
| 54-144581 | 11/1979 | Japan . |
| 57-166621 | 10/1982 | Japan . |
| 59-121414 | 7/1984 | Japan . |
| 59-218522 | 12/1984 | Japan . |
| 1183140 | 3/1970 | United Kingdom . |

OTHER PUBLICATIONS

Patent Abstracts of Japan, vol. 007, No. 010, Jan. 14, 1983 & KP 166621A.
Patent Abstracts of Japan, vol. 009, No. 090, Apr. 19, 1985 & JP 218522A.

*Primary Examiner*—David A. Bucci
*Assistant Examiner*—William C Joyce
*Attorney, Agent, or Firm*—Arent Fox Kintner Plotkin & Kahn, PLLC

[57] ABSTRACT

A composite selector fork arrangement adapted to cooperate with a selector shaft to resist rotational and translational movement relative to the selector shaft. The arrangement also being adapted to cooperate with a selector sleeve to effect translational movement of the selector sleeve. The arrangement including a first and second metallic portion. The first metallic portion being arranged to impart stiffness to the fork arrangement in a direction generally in line with the axial extent of a selector shaft and the second metallic portion being arranged to impart stiffness to the fork arrangement in a direction generally transverse to the axial extent of a selector shaft. The arrangement including a non-metallic portion being arranged to at least partially surround the first and second portions, and in which, in use, the non-metallic portion cooperates with a selector shaft to assist in resisting rotational movement of the selector fork arrangement relative to the selector shaft. The non-metallic portion is located in position when the first and second portions are located in their required positions relative to the selector shaft by forming the non-metallic portion when the first and second portions are so located.

17 Claims, 28 Drawing Sheets

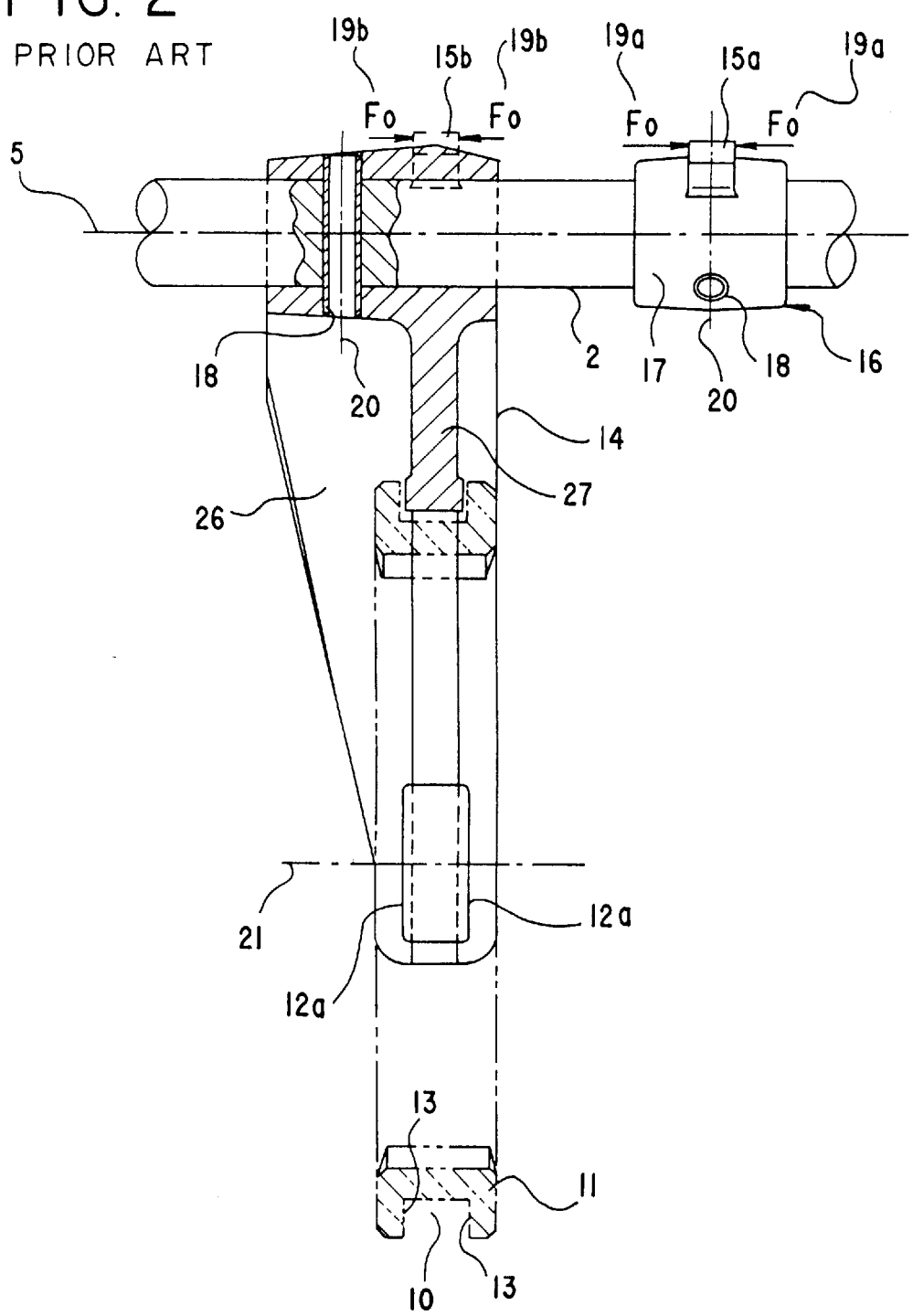

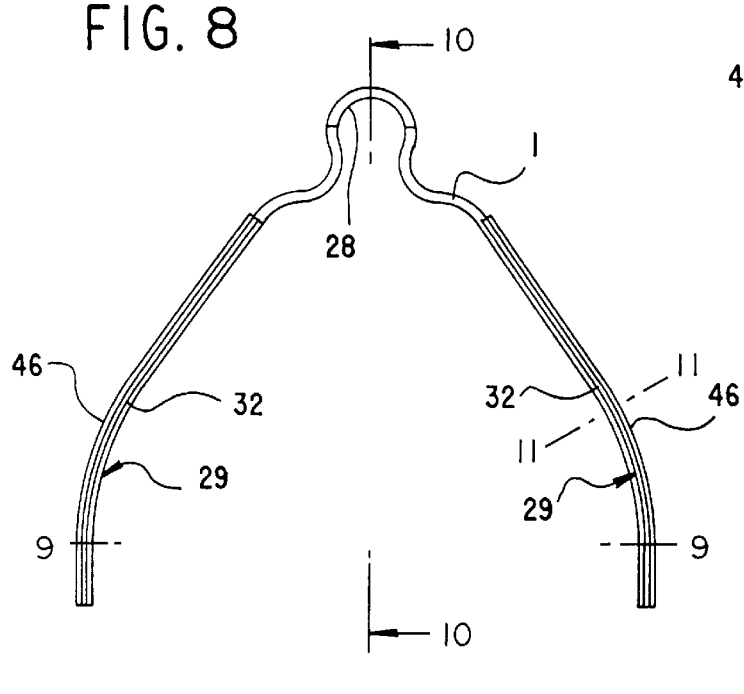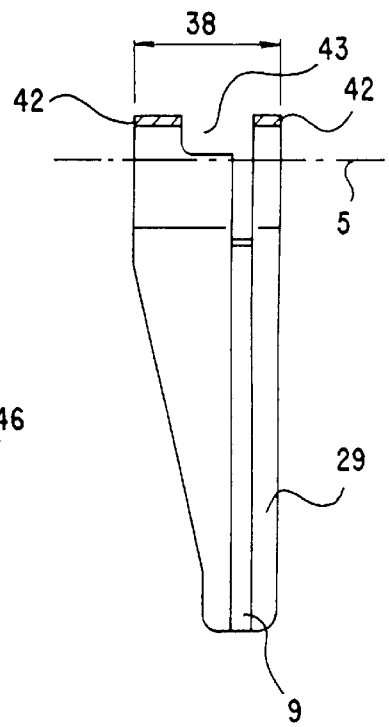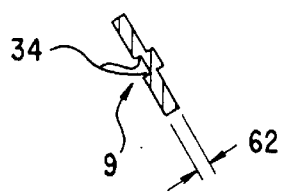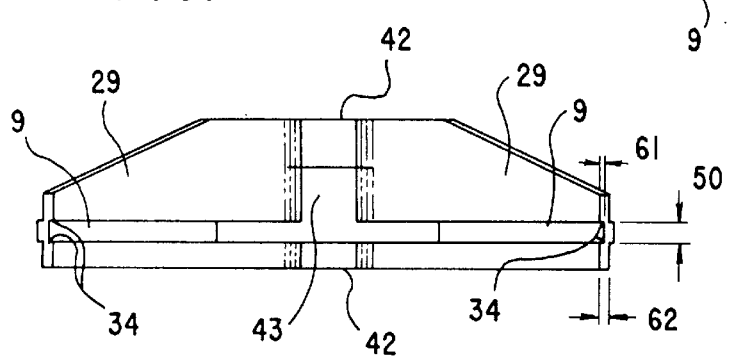

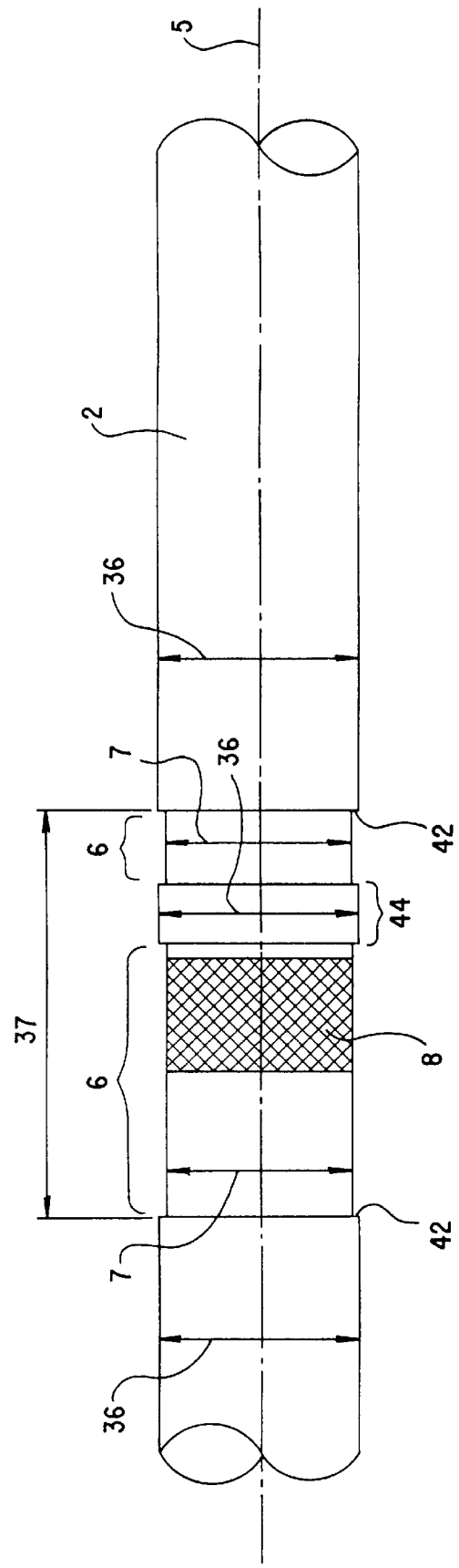

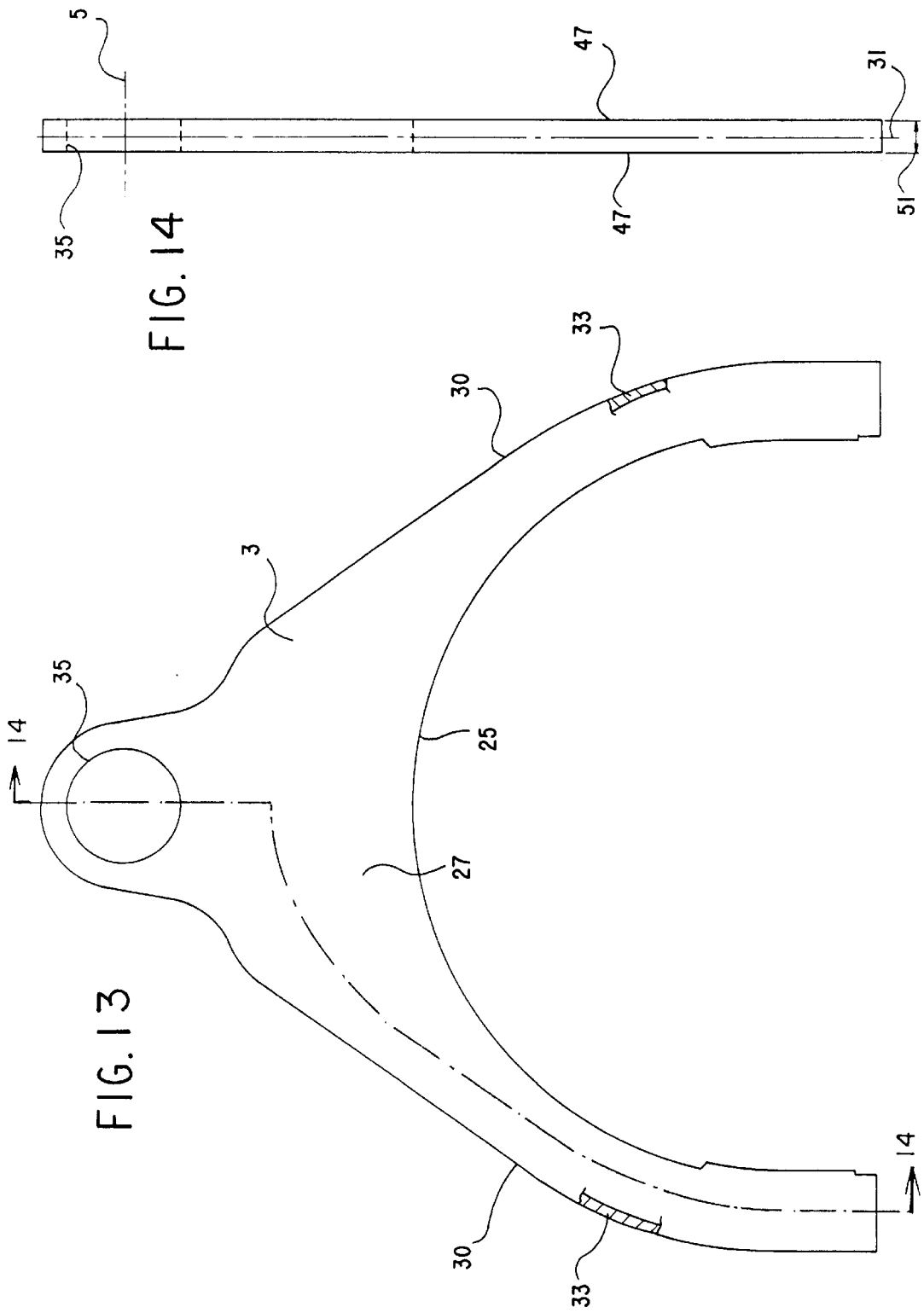

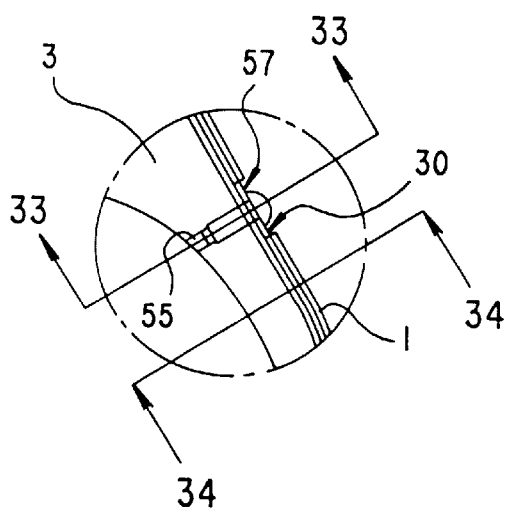
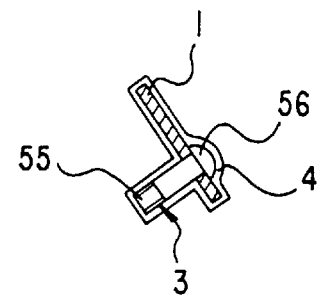
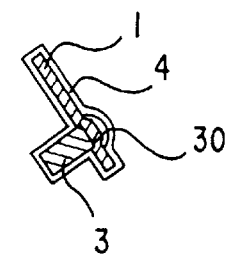
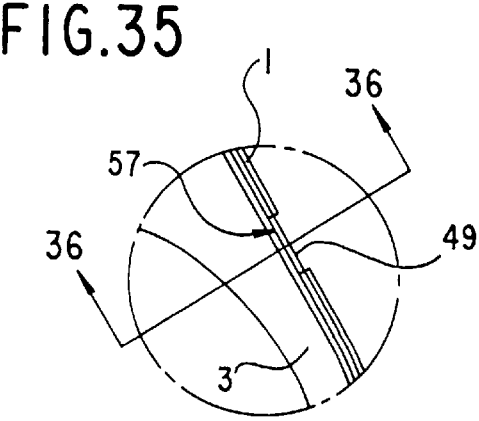
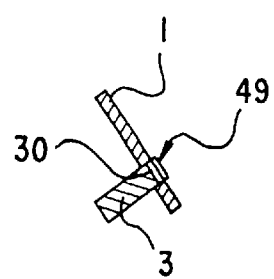

SEE FIG.39A

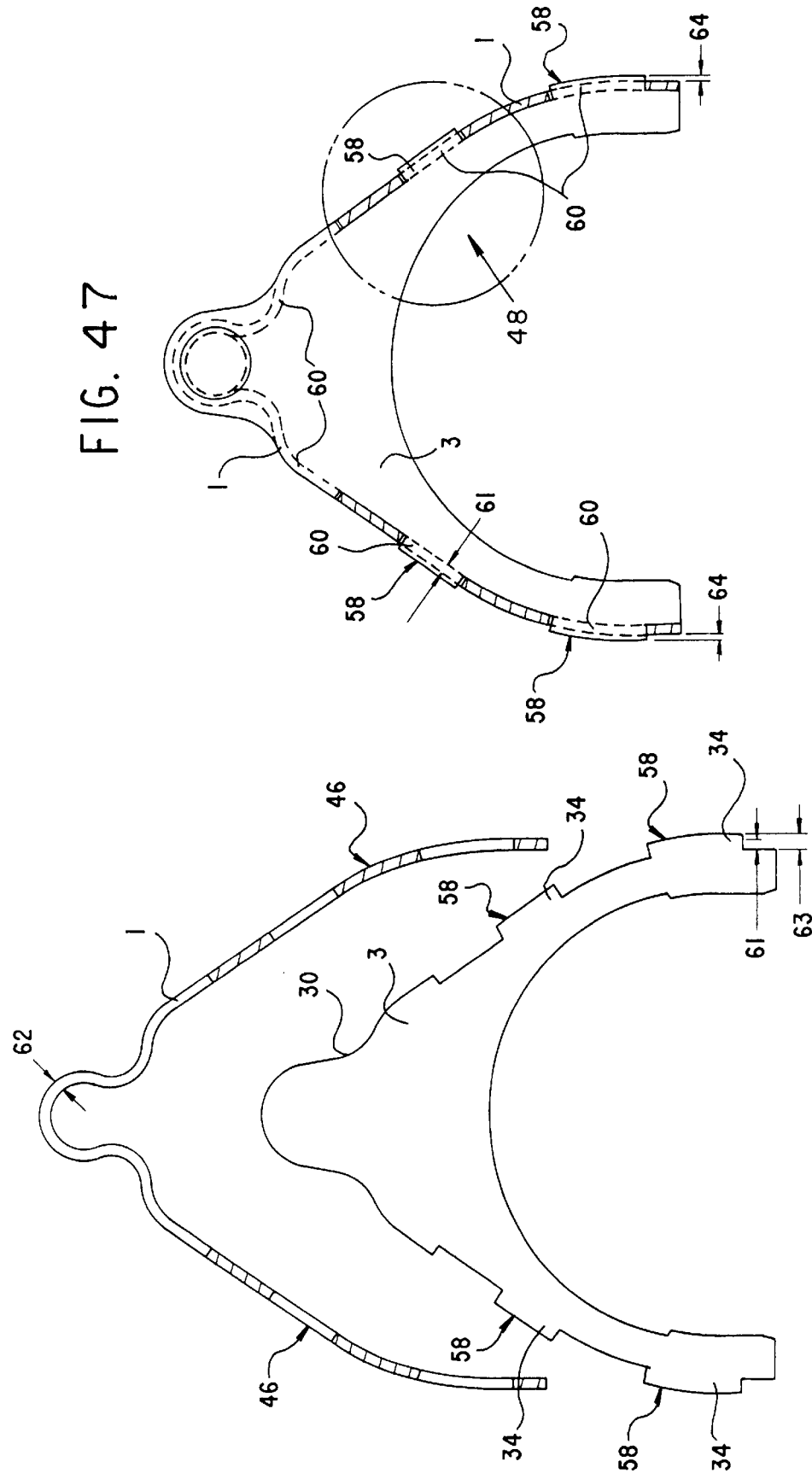

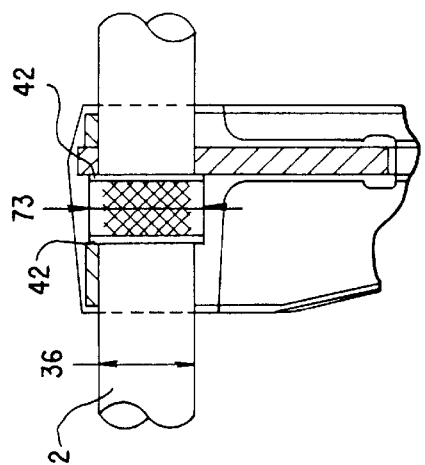
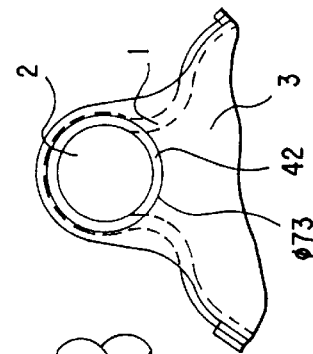
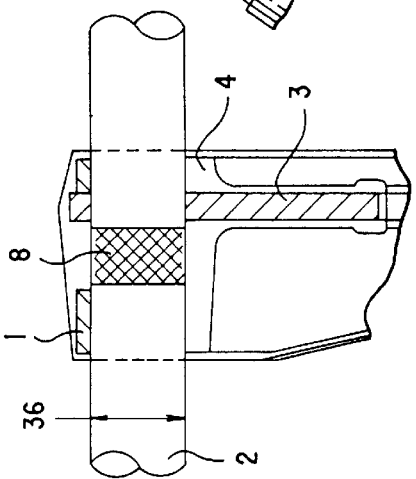
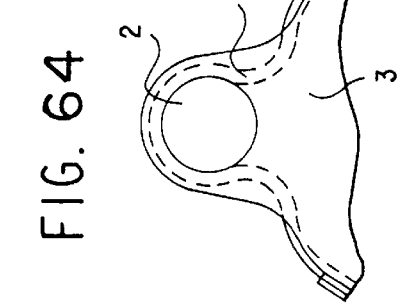
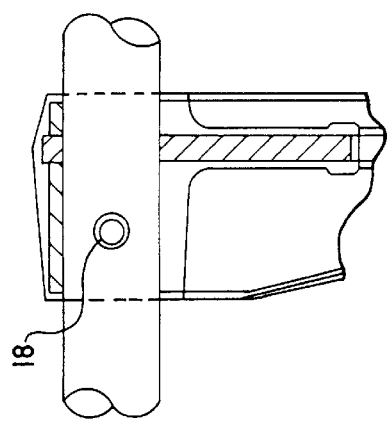
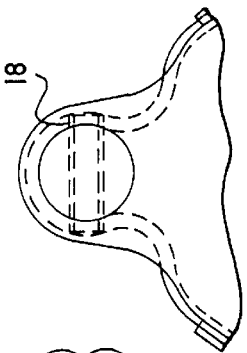
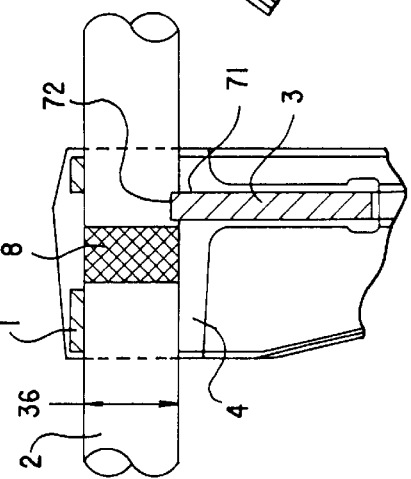
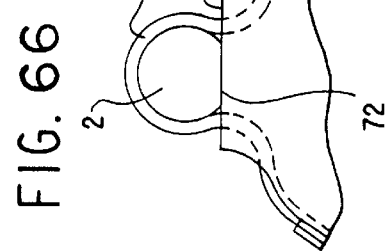

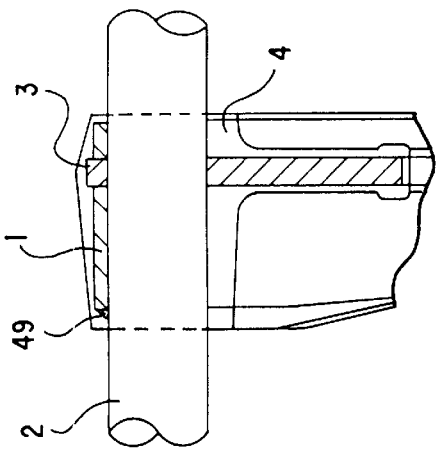
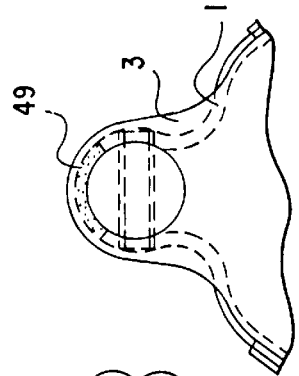
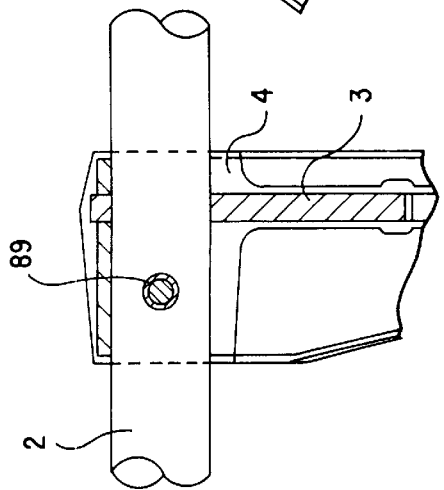
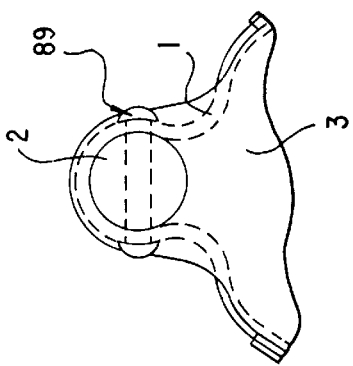

the required axial movement of the sleeve 11. In an alternative,

COMPOSITE SELECTOR FORK ARRANGEMENT ADAPTED TO COOPERATE WITH A SELECTOR SLEEVE

BACKGROUND OF THE INVENTION

1. Field of the Invention

The present invention relates to a composite selector fork arrangement, a composite selector fork arrangement when mounted on a selector rod, a method of mounting a composite selector fork, a method of forming a composite selector fork, a method of forming a composite selector fork arrangement, a selector rod and a selector fork arrangement and a mounting arrangement for a first and second member.

2. Discussion of Related Art

The manual transmission of motor vehicles involves the axial movement of a shift fork in order to operate a sliding synchroniser sleeve or clutch. The shift fork is mounted on a shaft that is remote from the sliding clutch with the shaft also being movable axially upon operation of a gear shift mechanism. A considerable force is required in order to effect the movement of the shift fork when the shift shaft is moved to thereby cause the remote synchroniser sliding sleeve or clutch to move to cause a gear to be engaged or disengaged. Furthermore, the attachment of the fork to the shift shaft requires to be quite accurate in the axial direction in order to ensure correct engagement and disengagement of the gears upon the remote movement of a gear shift mechanism. In addition, the environment of the transmission is a harsh environment that is subject to high temperatures.

Accordingly, transmission shift forks have traditionally been made of metal. This has many disadvantages including the cost of construction that requires casting of the metal and then post machining of the metal by milling or drilling. In addition, in order to secure the fork to the shaft, the fork and the shaft have to be drilled, aligned, and pinned together. This makes assembly of the transmission shift forks into the transmission time consuming and expensive.

One such metal selector mechanism is shown in FIGS. 1–3 in which FIG. 1 is an axial view of the selector mechanism, FIG. 2 is a section taken along a line 2—2 of FIG. 1, and FIG. 3 is a section taken through the line 3—3 of FIG. 1.

A selector or shift fork 14 is cast out of metal and then machined to give the shape shown. The fork 14 is required to be connected to a circular selector shaft 2. As shown in FIGS. 1 and 2, the fork 14 extends partially around, and within a groove 10 formed in the circumferential extent of a sliding sleeve 11 whereby the fork and the sleeve are constrained to move together axially. The fork 14 is provided with circumferentially spaced pads 12a and 12b of plastics material that transfer forces between the fork 14 and the sleeve 11.

Axial movement of the sleeve 11 along a shaft (not shown) causes axially spaced gears either side the sleeve 11 to be engaged or disengaged with a drive in a conventional manner.

The fork 14 includes a hub 22 at its upper end having a cylindrical opening 23 that is located on a gear shift rod 2. A pin 18 is passed through the opening in the hub 22 and an opening in the shift rod 2 when those openings are aligned, in order to secure the rod and fork together.

The hub 22 may be directly formed with a lug 15b, which lug is used to transfer forces applied by a gear shift mechanism (not shown) to the selector fork in order to effect the required axial movement of the sleeve 11. In an alternative, instead of the lug 15b being provided directly on the hub 22, an axially spaced shift block 16 may be secured by a pin passing through that block 16 and the shaft 2 with that block 16 having a lug 15a. When forces are applied to the lug 15a, as shown at 19a, those forces are transferred through the block 16, the pin 18 and the shaft 2 to the selector fork 14 via the pin 18 that extends through the hub 22.

There can be problems in machining and assembling the mechanism shown in FIGS. 1 to 3 not only in terms of manufacturing difficulties but also in terms of ensuring that all of the parts are axially and radially aligned. In this respect it will be appreciated that a hole has to be drilled to the shift block 16 and also into the hub 22. Holes also have to be drilled through the shaft 2 (thereby weakening the shaft) with the parts then being assembled. Any inaccuracy between where all of those holes are drilled can result in incorrect axial alignment of the pads 12a and 12b with respect to the lugs 15a or 15b.

Furthermore, the pads 12a and 12b are preformed, and fit over the leg forming the T section similar to the one shown in FIG. 3 such that there is no possibility of any axial misalignment being able to be compensated for with the pads 12a and 12b.

Plastic selector forks have been proposed. However, the high performance plastics required is extremely expensive especially to cope with the high temperature differentials. Furthermore, although the plastics can have the strength necessary to effect the shift required without significant bending, the plastic has to be sufficiently large to withstand the bending forces resulting in increased volume and increased expense. As the size available within a transmission housing is generally restricted, it is not really practical to consider using such large pieces of plastics in such a confined space. Larger forks may also lead to further complications by shrouding the gear and synchroniser assemblies resulting in oil flow restrictions.

SUMMARY OF THE INVENTION

It is an object of the present invention to attempt to overcome at least some of the above mentioned problems.

According to a first aspect of the present invention, a selector fork arrangement includes a member adapted to extend from a selector shaft towards a selector sleeve, the member being arranged to resist flexure in a direction generally in line with the axial extent of a selector shaft, the member having been formed from a substantially planar sheet of material.

The planar extent of the member may be generally in the direction of axial extent of a selector shaft.

The member may be arranged to cooperate with a selector shaft to resist relative rotational and/or translational movement to that shaft. The member may be arranged to cooperate directly with a selector shaft.

The member may comprise a metallic member.

The fork arrangement may include a second member arranged to resist flexure in a direction generally transverse to the axial extent of a selector shaft and that second member may have been formed from a substantially planar sheet of material such as metallic material. The planar extent of the second member may be generally in a direction transverse to the axial extent of a selector shaft.

A second and subsequent aspects of the invention will now be described. The first aspect may have any of the features of the second or subsequent aspects or any of the sub features of those aspects whether or not combined with their main aspects.

According to a further aspect of the present invention a composite selector fork arrangement is adapted to cooperate with a selector shaft to resist rotational and translational movement relative to the selector shaft, the arrangement also being adapted to cooperate with a selector sleeve to effect translational movement of the selector sleeve, the arrangement including a first metallic portion arranged to impart stiffness to the fork arrangement in a direction generally in line with the axial extent of a selector shaft and a second metallic member arranged to impart stiffness to the fork arrangement in a direction generally transverse to the axial extent of a selector shaft.

The first and second portions may be arranged to cooperate with each other and may be arranged to directly cooperate with each other.

The first portion may be adapted to cooperate with the selector shaft. The second portion may be adapted to cooperate with a selector sleeve.

Either or both of the first and second portions may comprise a plate. The extent of the plane of the plate of the first portion may extend generally in the axial direction of the selector shaft. The extent of the plane of the plate of the second portion may extend generally in the radial direction of a selector shaft. The or each plate may have been subjected to a pressing operation such as a pressing operation with fine blanking.

The first portion may be arranged to cooperate directly with the shaft to resist relative axial movement. The first portion may include a pair of spaced abutments each arranged to cooperate with a selector shaft to resist relative axial movement in opposed axial directions. The abutments may be arranged to be located on opposite sides, in an axial direction relative to a selector shaft, to the second portion.

In the region of a selector shaft, the first portion may be arranged to extend to a location remote from the second portion in an axial direction at at least one side of the second portion.

The first portion may include a pair of spaced arms at a location away from part of the first portion that are adapted to cooperate with a selector shaft. The arms may be movable away from each other, for instance against a resilient force caused by flexure of the first portion.

The movement of the pair of spaced arms of the first portion may allow the first portion to be moved in to a position to cooperate with a selector shaft by relative axial movement of the first portion to a selector shaft, or relative radial movement, or both.

The movement of the spaced arms of the first portion away from each other may be arranged to assist in the location and engagement of the first portion with the second portion by subsequently causing or allowing those arms to move back towards each other.

The first portion may be arranged to be a snap-fit onto the second portion.

The first portion may be arranged to partially surround a selector shaft.

The second portion may be arranged to surround a selector shaft or may be arranged to abut with a selector shaft or may be arranged to be spaced from a selector shaft.

The second portion may be located in at least one opening formed by a pressing, in the first portion, along at least part of their co-extent. The opening may comprise at least one groove.

The second portion may be arranged to extend through an opening in the first portion or beyond the opening in the first portion.

The first and second portion may be arranged to be held together by the resilience of the first portion, by welding, by rivets, by screws, by glue, by an interference fit, or any combination thereof.

The second portion may include a flange arranged, in use, to cooperate with the flat of a selector shaft to assist in restraining the first and second portions from rotational movement or axial movement or both relative to a selector shaft.

The second portion may include a pair of spaced arms arranged to cooperate with opposed portions of a selector sleeve.

The arrangement may include a third portion, which may comprise a metallic portion, that is spaced from the second portion, the third portion also being arranged to impart stiffness to the arrangement in a direction generally transverse to the axial extent of a selector shaft. The third portion may be arranged to effect movement of a selector sleeve. The third portion may have any of the features of the second portion and may cooperate with the first portion in the same way as previously described in relation to the cooperation of the first and second portions.

The present invention also includes a composite selector fork arrangement as herein referred to when mounted on a selector shaft.

The arrangement may include a non-metallic portion, which may be plastics. The non-metallic portion may be arranged to at least partially, and preferably substantially completely surround the first and second portions.

The non-metallic portion may cooperate with the selector shaft to assist in resisting rotational movement of the selector fork arrangement relative to the selector shaft. The non-metallic portion may cooperate with a knurled portion or a flat portion or both of the selector shaft.

The non-metallic portion may be located between axially spaced parts of the first portion in the region of the selector shaft.

The non-metallic portion may be arranged to contact a selector sleeve in order to effect movement of a selector sleeve.

The non-metallic portion may be located in position when the first and second portions are located in their required positions relative to the selector shaft, for instance by forming the non-metallic portion when the first and second portions are so located such as forming the non-metallic portion by moulding.

The non-metallic portion may include a flange arranged to increase the stiffness of the first and second portions or both.

The non-metallic portion may be arranged to assist in retaining, or retain the first and second portions in the required position.

The non-metallic portion may be arranged to resist flexure of the first portion such as flexure in a generally radial direction.

The first portion may be arranged to cooperate with the selector shaft in the region of a reduced cross-sectional area of the selector shaft. At least one, and preferably two axial ends of the first portion may be arranged to be abutted by the selector shaft to resist relative axial movement of the selector fork arrangement and the selector shaft.

According to another aspect of the present invention a method of mounting a composite selector fork onto a selector shaft comprises locating a first and second metallic portion in position relative to the selector shaft with the first portion being arranged to impart stiffness in a direction generally in line with the axial extent of the selector rod and a second portion being arranged to impart stiffness in a direction generally transverse to the axial extent of the selector rod, the method further comprising adding a non-metallic portion, the selector fork being restrained against axial and translational movement relative to the selector shaft.

According to another aspect of the present invention a composite selector fork arrangement includes at least two metallic components that are assisted in being held together by a non-metallic material.

According to a further aspect of the present invention a method of forming a composite selector fork arrangement comprises forming a non-metallic component into the required shape after at least two metallic components have been located in their required relative positions.

The non-metallic material may be moulded.

The non-metallic material may be plastic.

According to a further aspect of the present invention a method of making a selector shaft and selector fork arrangement comprises locating a metal portion of the fork arrangement in position relative to the selector shaft and forming a non-metallic material to engage both the metal portion of the selector fork and the selector shaft to assist in maintaining the metal portion in position relative to the selector shaft.

According to another aspect of the present invention a method of making a selector fork arrangement that includes a selector shaft in which the selector shaft is arranged to cooperate with a selector sleeve comprises monitoring the axial location of a part of the arrangement in the region of the shaft and controlling the axial extent at which the selector shaft engages a selector sleeve at each axial side in dependence upon the location monitored.

The axial extent may be controlled by causing additional material to be added to the selector shaft in the region of the selector sleeve such that the thickness in an axial direction of that added material is greater at one side than at the other side. The method may comprise making the overall axial extent in the region of the selector sleeve substantially constant. Additional material may be added by moulding such as by injection moulding.

According to a further aspect of the present invention a method of forming a composite selector fork arrangement that includes a selector fork including a metallic portion mounted on a selector shaft with the selector fork being arranged to cause a selector sleeve to move in an axial direction with the arrangement including a non-metallic material of the fork being arranged to abut with a selector sleeve, comprises the non-metallic material being formed on the metallic portion after the relative positions of the selector shaft and the metallic component are determined.

The method may comprise varying the thickness of the non-metallic portion in an axial direction in order to ensure that the selector shaft and the selector fork are correctly aligned with the selector sleeve in an axial direction. The selector fork arrangement may be arranged to cause a selector sleeve to move in a selected one of two opposed axial directions and the non-metallic material may be arranged to contact the selector sleeve at spaced locations to cause the movement in the required direction with the method comprising making the distance between the surfaces of the non-metallic material that is arranged to contact the selector sleeve constant despite the thickness of the non-metallic portion on opposed sides of the metallic portion being varied.

According to another aspect of the present invention a selector shaft and selector fork arrangement is provided whereby the selector fork is adapted to cause a selector sleeve to be moved in an axial direction, the selector shaft being provided with at least one engagement or abutment on its exterior surface arranged to engage the selector fork to cause axial movement of the selector fork.

The selector shaft may include a pair of spaced abutments on its exterior surface whereby the selector shaft can cause the selector fork to move in opposed axial directions to cause a selector sleeve to move in opposed axial directions.

The or each axial abutment on the shaft may comprise a region of reduced cross-sectional area.

The or each abutment may be arranged to directly engage a member of the selector fork that extends towards a selector shaft or may be arranged to indirectly engage that member such as through a plastics portion that may be injection moulded and which may take up manufacturing tolerances. When indirect engagement is provided the member may be movable axially relative to the shaft in order that axial alignment of the parts may occur prior to causing the indirect engagement of the member and the shaft. The member may be located in the same axial line as the abutment.

The selector shaft may include an exterior surface that has an uneven surface with which the selector fork is arranged to cooperate to assist in preventing relative rotational movement of the fork and shaft. The uneven surface of the selector shaft may be arranged to be engaged by a non-metallic material of the selector fork such as a plastics material. The non-metallic material may be formed on the shaft, for instance by moulding the non-metallic material onto the shaft.

The fork may include a member that is arranged to be a snap-fit on the shaft and that member that is a snap-fit may be arranged to be engaged by the or each abutment for instance either directly or indirectly (such as by plastics that may be injected) to effect the axial movement of a selector sleeve.

The fork may include a portion that is arranged to surround the shaft and the cross-sectional area of the shaft that is arranged to be surrounded by a portion of the fork may be of generally the same cross-sectional area as the majority of the remainder of the external surface of the shaft. The abutment may be spaced from one side of the region where the portion surrounds the rod and where two abutments are provided, those abutments may be provided on different sides of the region that is surrounded by the portion of the fork.

According to a further aspect of the present invention in a mounting arrangement for a first and second member in which the second member extends at least partially through the first member, at least one of the members includes at least one recess in the region where the members face each other, the recess including a filler to resist relative movement of the members towards each other in a direction of one member towards the recess in the other member.

Recesses may be provided on both sides of the extent of the second member through the first member. The recesses along both sides may be generally opposed to each other or may be offset from each other.

The or each recess may comprise an arcuate recess.

The or each recess may be provided on the first member.

The or each recess may comprise an opening. The or each opening may be arranged to assist in the transfer of filler from one side of the opening to the other side.

The first and second members may comprise metallic members.

The filler may comprise a non-metallic material such as plastics. The filler may be moulded into the or each recess.

The first and second members may comprise parts of a composite selector fork.

The present invention includes any combination of the herein referred to features or limitations.

BRIEF DESCRIPTION OF DRAWINGS

Other objects and features of this invention will be better understood from the following description, with reference to the accompanying drawings, wherein:

FIG. 2 is a sectional view of the conventional metal selector mechanism of FIG. 1 taken along section line 2—2;

FIG. 8 is an axial front view of a metal rib plate comprising a selector fork according to this invention;

FIG. 9 is a sectional view of the metal rib plate comprising a selector fork of FIG. 8 taken along section line 9—9;

FIG. 10 is a sectional view of the metal rib plate comprising a selector fork of FIG. 8 taken along section line 10—10;

FIG. 11 is a sectional view of the metal rib plate comprising a selector fork of FIG. 8 taken along section line 11—11;

FIG. 12 is a side view of a selector shaft according to this invention;

FIG. 13 is a front view of a metal rib plate comprising a part of a selector fork according to this invention;

FIG. 14 is a side view of a metal rib plate comprising a part of a selector fork according to this invention of FIG. 13 taken along section line 14—14;

FIG. 32 is a cross-sectional view of another embodiment of the interface between the web plate and the rib plate illustrated in FIG. 23;

FIG. 33 is a cross-sectional view of the interface between the web plate and the rib plate according to this invention as illustrated in FIG. 32 taken along section line 33—33;

FIG. 34 is a cross-sectional view of the interface between the web plate and the rib plate according to this invention as illustrated in FIG. 32 taken along section line 34—34;

FIG. 35 is a cross-sectional view of yet another embodiment of the interface between the web plate and the rib plate illustrated in FIG. 23;

FIG. 36 is a cross-sectional view of the interface between the web plate and the rib plate according to this invention as illustrated in FIG. 35 taken along section line 36—36;

FIG. 46 is an exploded front view illustrating another embodiment of the rib plate assembled with a modified web plate according to this invention;

FIG. 47 is a front partial sectional view illustrating the rib plate assembled with the modified web plate according to this invention;

FIGS. 64 to 75 are axial front views and cross-sectional views of various embodiments of the interfaces between the shift shaft and the transmission fork;

DETAILED DESCRIPTION OF THE PREFERRED EMBODIMENTS

Figure 1:
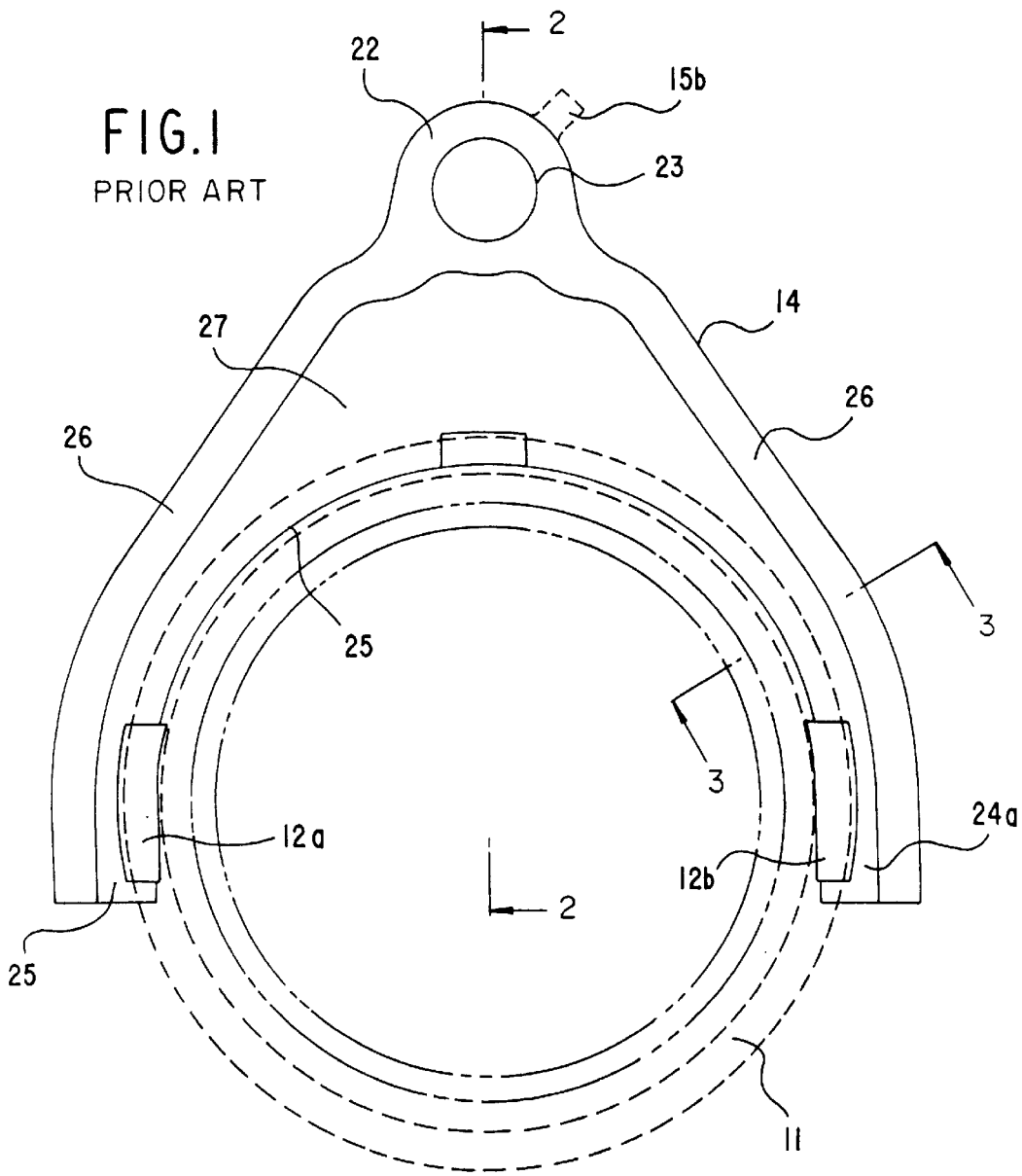
FIG. 1 is an axial view of a conventional metal selector mechanism.
Figure 3:
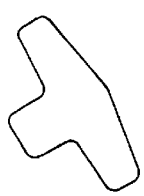
FIG. 3 is a sectional view of the conventional metal selector mechanism of FIG. 1 taken along section line 3—3.
Figure 4:
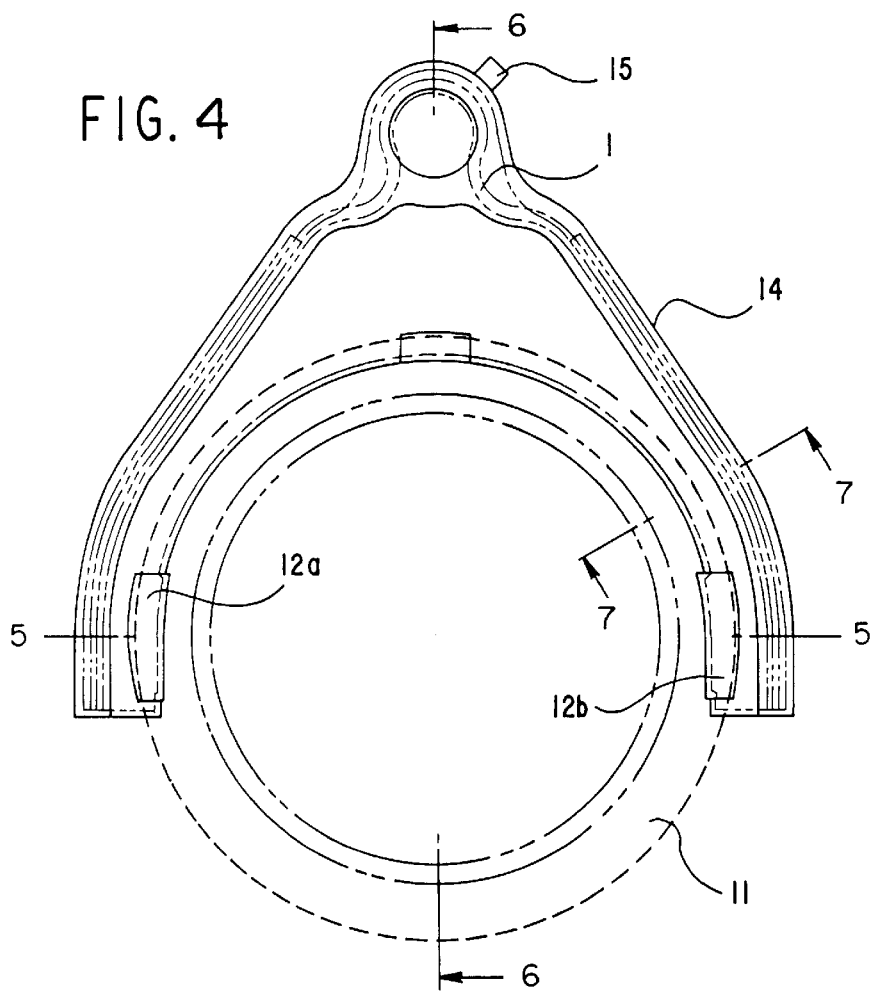
FIG. 4 is an axial view of a composite metal and plastic selector fork arrangement according to this invention.
Figure 7:
FIG. 7 is a sectional view of the composite metal and plastic selector fork arrangement of FIG. 4 taken along section line 7—7.
Figure 5:
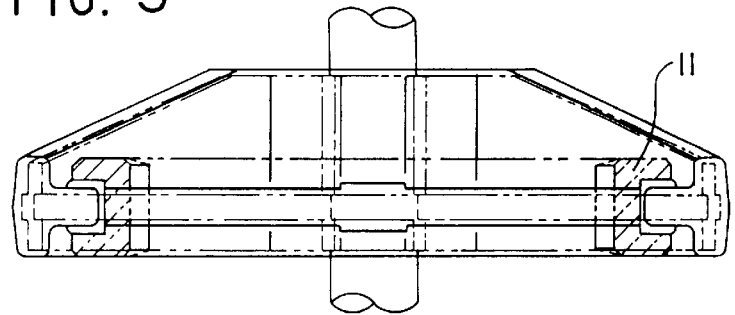
FIG. 5 is a sectional view of the composite metal and plastic selector fork arrangement of FIG. 4 taken along section line 5—5.
Figure 6:
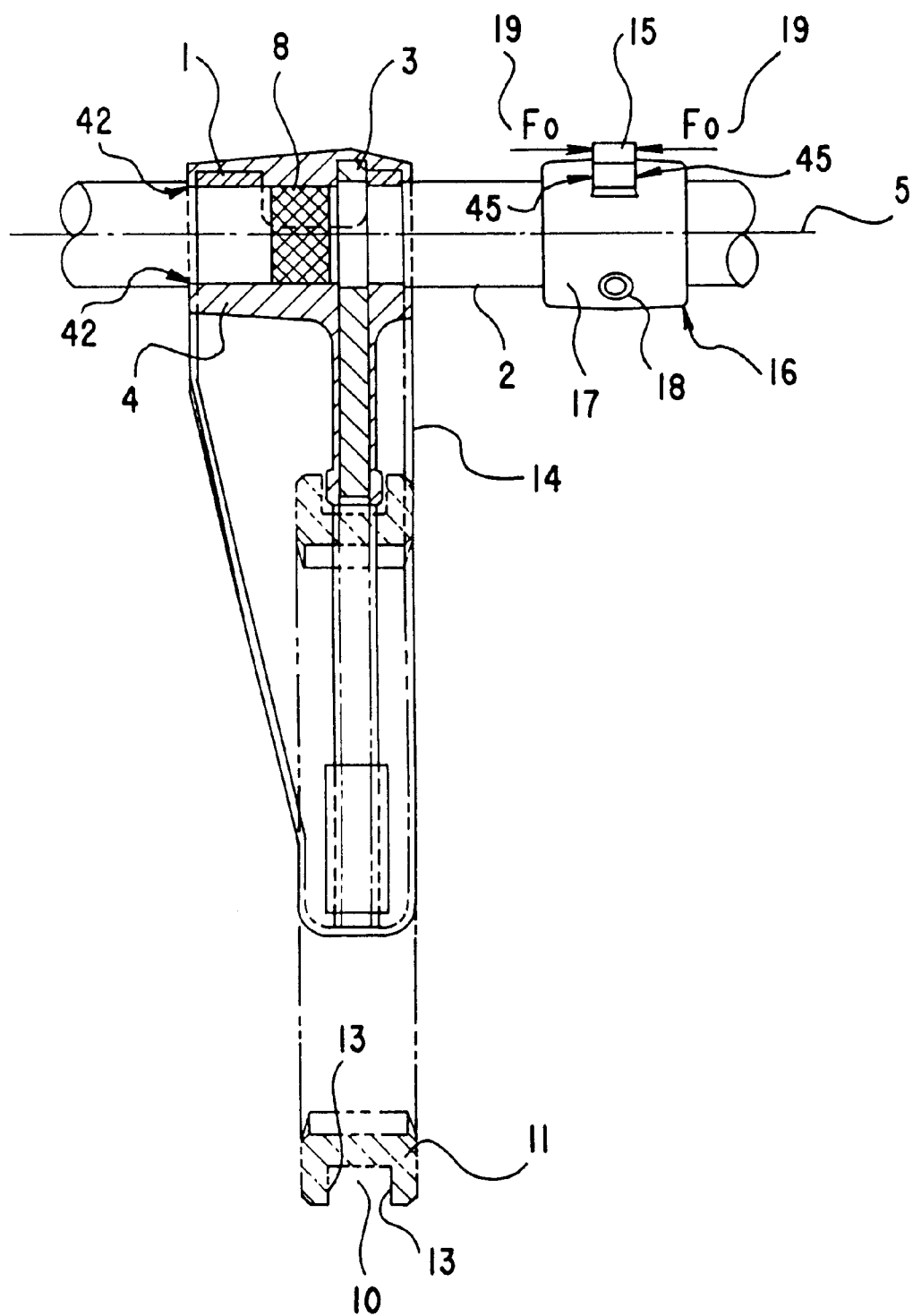
FIG. 6 is a sectional view of the composite metal and plastic selector fork arrangement of FIG. 4 taken along section line 6—6.

As shown in FIGS. 4 to 14 the selector fork is a composite fork comprising a metal rib plate 1 and a metal web plate 3. The rib plate and the web plate are arranged to be assembled together after the web plate has been mounted on the selector shaft. The rib plate imparts stiffness in the axial direction and the web plate imparts stiffness in the radial direction.

The rib plate 1 comprises a generally semicircular portion 28 where the inner radius is equal to or slightly smaller than the radius of the shift shaft 2. This radius extends as a full radius for just over 180°. Two leg portions 29 of the rib plate are shaped to mate with the outer profile of the web plate 30. As shown in FIGS. 13–14, the web plate 3 provides the web portion 27 of the fork incorporating an outer profile 30 arranged to mate with the inside profile 32 of the rib plate 1 in the groove area 9. In use, the rib plate 1 and the web plate 3 provide a path through which force may react between the web plate outer edges 33 and the rib plate groove abutment faces 34.

The rib plate 1 may be constructed from carbon spring steel grade. The rib plate 1 and web plate 3 may be metal pressings produced by fine blanking. The thickness and material of the rib plate 1 and web plate 3 may be varied depending on the loads the fork will take to best suit the application.

The web plate 3 may have a circular hole 35 slightly larger than the outside diameter 36 of the shift shaft 2 diameter 36.

Figure 15:
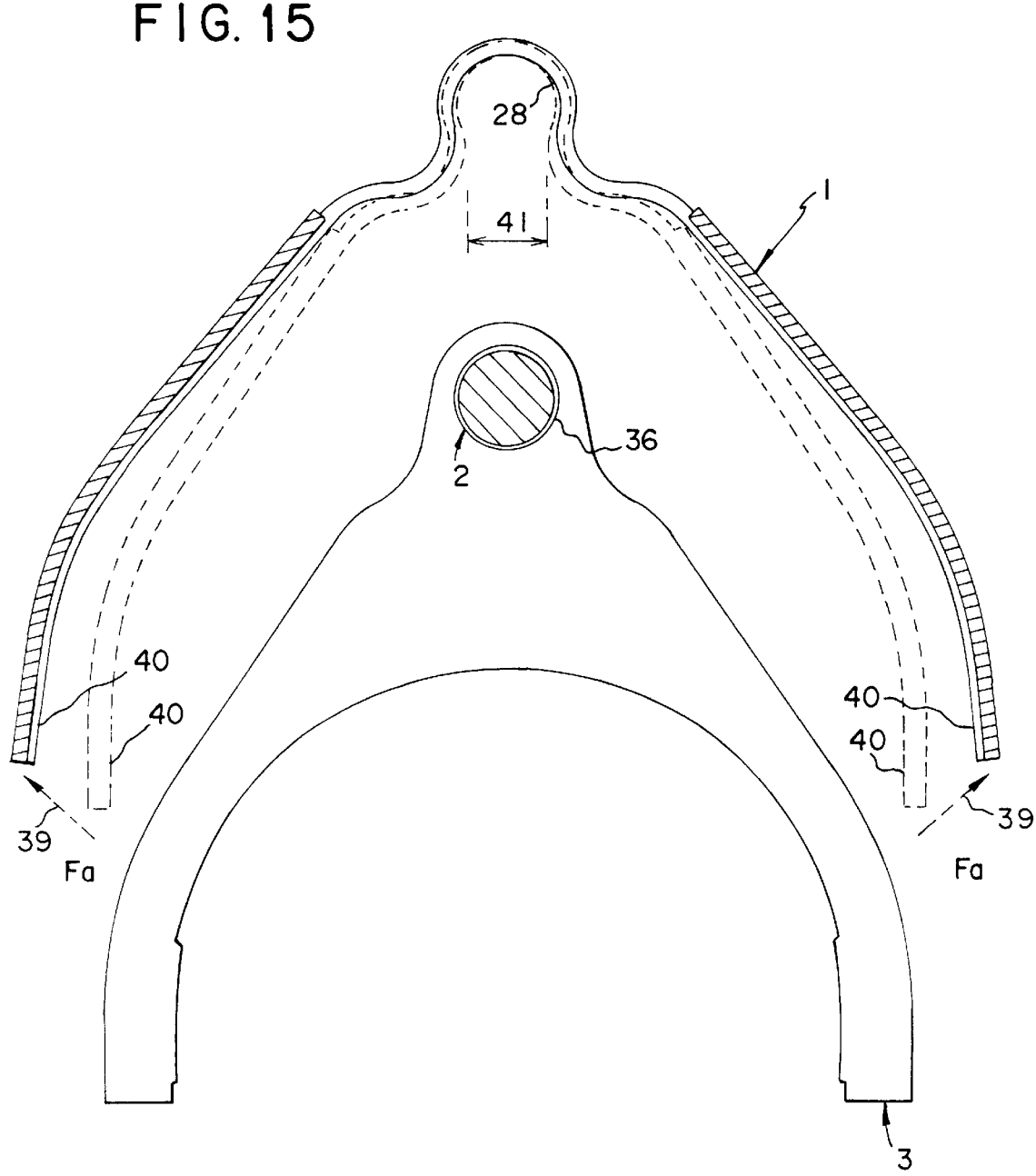
FIG. 15 is an exploded axial view illustrating the rib plate shown in FIGS. 4–7 assembled with the web plate shown in FIG. 12, on a selector shaft.

As shown in FIG. 15, the rib plate 1 is capable of being sprung outwards by applying force 39 to the inside of the legs 40 of the rib plate 1. The act of forcing the legs apart opens up the gap 41 which exists adjacent to the formed radius 28 to suit the shift shaft 2, and this radius 28 extends for over 180°. This enables the rib plate 1 to be assembled to the shift shaft 2 either approaching in the direction of the shaft axis 5 and over the outside diameter 36 of the shaft 2 or in a direction perpendicular to the shaft axis 5. The direction of assembly depends on convenience or framework structure constraints.

Figure 21:
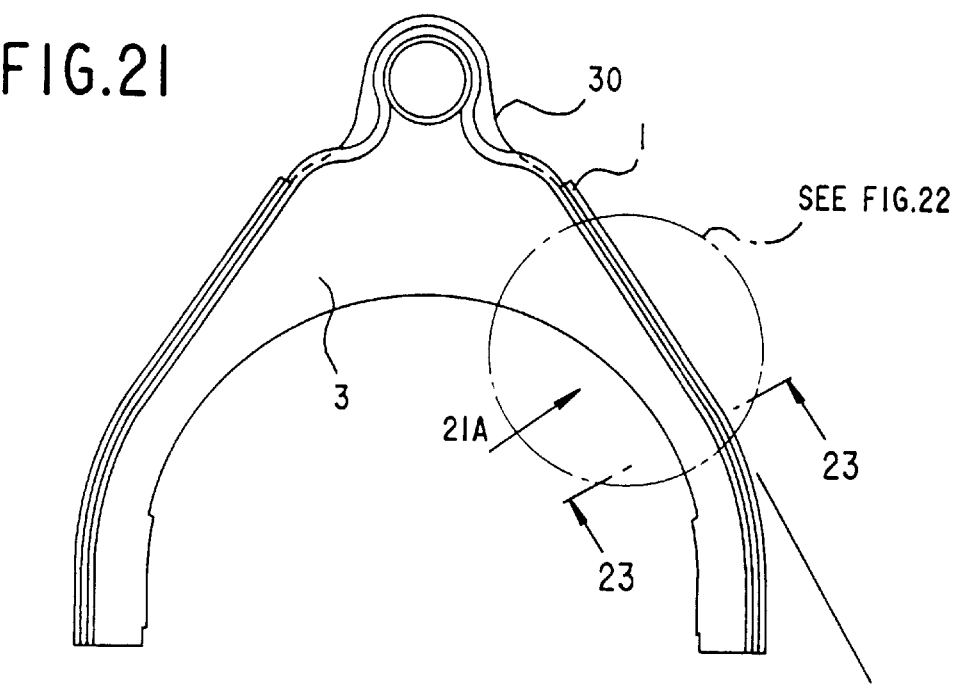
FIG. 21 is an axial view of another embodiment illustrating the interface between a web plate and a rib plate according to this invention.
Figure 21A:
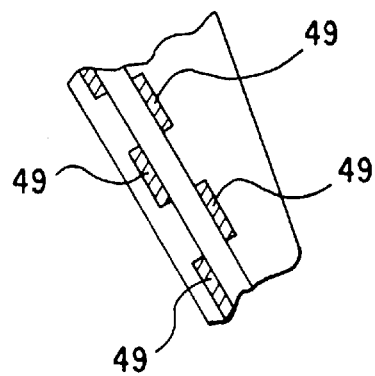
Figure 22:
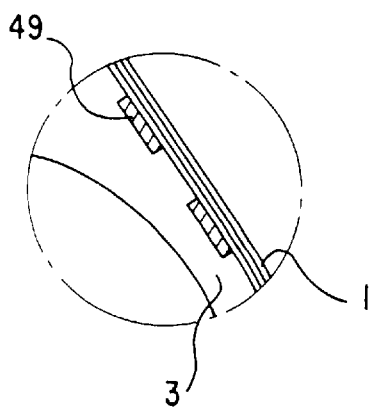
FIG. 22 is an enhanced view of a type of interface between a web plate and a rib plate according to this invention as illustrated in FIG. 21.
Figure 23:
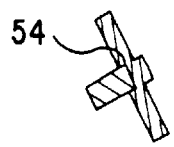
FIG. 23 is a cross-sectional view of the interface between the web plate and the rib plate according to this invention as illustrated in FIG. 21 taken along section line 23—23.
Figure 24:
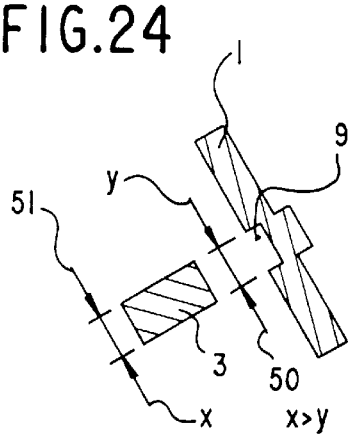
FIG. 24 is a cross-sectional view of an embodiment of a groove of the interface between the web plate and the rib plate illustrated in FIG. 23.
Figure 25:
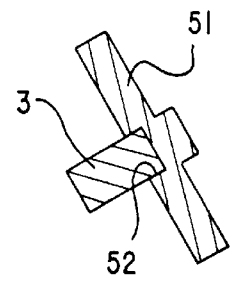
FIG. 25 is a cross-sectional view of another embodiment of the groove of the interface between the web plate and the rib plate illustrated in FIG. 23.
Figure 26:
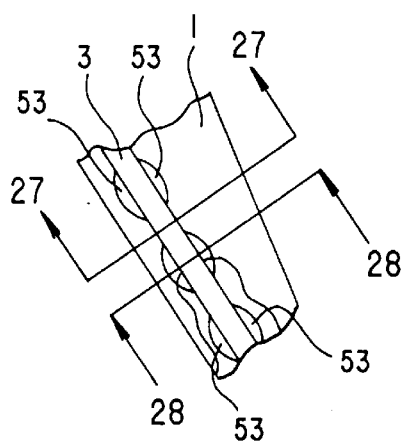
FIG. 26 is a cross-sectional view of yet another embodiment of the groove of the interface between the web plate and the rib plate illustrated in FIG. 23.
Figure 28:
FIG. 28 is a cross-sectional view of the interface between the web plate and the rib plate according to this invention as illustrated in FIG. 26 taken along section line 28—28.
Figure 27:
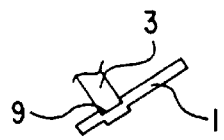
FIG. 27 is a cross-sectional view of the interface between the web plate and the rib plate according to this invention as illustrated in FIG. 26 taken along section line 27—27.
Figure 29:
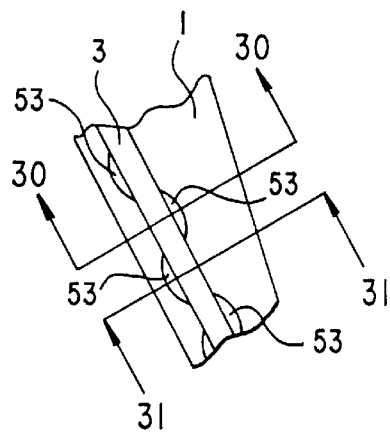
FIG. 29 is a cross-sectional view of another embodiment of the groove of the interface between the web plate and the rib plate illustrated in FIG. 23.
Figure 31:
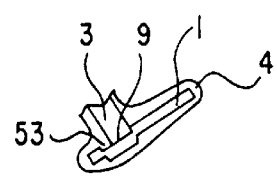
FIG. 31 is a cross-sectional view of the interface between the web plate and the rib plate according to this invention as illustrated in FIG. 29 taken along section line 31—31.
Figure 30:
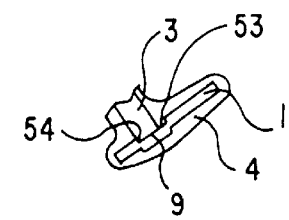
FIG. 30 is a cross-sectional view of the interface between the web plate and the rib plate according to this invention as illustrated in FIG. 29 taken along section line 30—30.

The spring action of the rib plate 1 to mechanically locate and restrain the web plate 3 may be cost effective and suitable for low loaded applications. However, the framework may be made more rigid by fixing the web plate 3 to the rib plate 1. The web plate 3 can be tack or spot welded 49 to the rib plate 1 as shown in FIGS. 21–23. As shown in FIG. 24, the groove 9 in the rib plate 1 can be slightly narrower in width 50 than the web plate thickness 51, thus providing an interference fit. As shown in FIG. 25 the junction of the web plate 3 and rib plate groove 5 can be held together by adhesion 52 using a proprietary adhesive such as Loctite (RTM). The groove can be shaped as shown in FIGS. 26–31. This enables plastic material 4 to be moulded into scallops 53 provided in the groove 9 either side of the web plate 3, this ensures a firm bond or abutment to prevent any relative movement between the parts in a direction transverse to the extent of the groove despite small clearances 54 between the rib plate groove 9 and the web plate 3 which may not fill with plastic properly. The scallops in FIGS.

26–28 are opposite each other at either side of the web plate 3 whilst those in FIG. 9E are offset relative to each other.

The groove 9 can be constructed as a combination of both semi and full shear pressing, as shown in FIGS. 32–34 and 35–36. Where the groove 9 is fully sheared the web plate edge 30 is exposed. Self tapping screws 56 could be used to hold the web plate 3 to the rib plate 1. A plastic covering 4 would ensure that the screws could not work loose due to driveline vibration since the screw head would be encapsulated. Alternatively the web plate 3 could be tack welded 49 to the rib plate 1 as shown in FIGS. 35–36.

The need for the semi sheared groove 9 can be removed by the use of various geometric shapes for the outer profile 30 of the web plate 3. FIGS. 39–51 shows web plates 3 with protruding lug portions 58 on the outer peripheral edge 30. These are complemented by fully sheared slots 59 in the rib plate 1 to accept the web lugs 58. This construction enables the web plate 3 to be snapped into position in the rib plate 1 at assembly. The construction also provides faces 34 of the lug 58 to bear against the slot sides 59 to transfer loads in a similar way as the groove 9 does in previous examples but with a greater contact depth 61 for the same given rib plate thickness 52 and a potentially greater contact area 60. Also, this construction enables the overall outside profile of the fork to be produced within a smaller envelope than with the semi-shear method for the same rib plate thickness 61.

Figure 50:
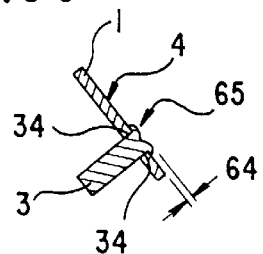
FIG. 50 is a cross-sectional view of the interface between the rib plate and modified web plate illustrated in FIG. 46 taken along section line 50—50.
Figure 51:
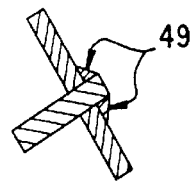
FIG. 51 is a cross-sectional view of an alternate embodiment of the interface between the rib plate and modified web plate illustrated in FIG. 46.

The structure may be made more rigid if the lug portions 58 of the web plate 3 protrude from the outer surface 46 of the rib plate 1, as shown in FIGS. 46–47 and 51. The protruding material 54 may be swaged over as shown at 65 to hold the rib plate 1 and the web plate 3 in position as shown in FIG. 50. Alternatively the rib plate 1 and the web plate 3 may be fastened together by welds 49 (see FIG. 51), screws 56 (see FIG. 44), glue 52 (see FIG. 45) or other fastening method or by using an interference fit.

Figure 52:
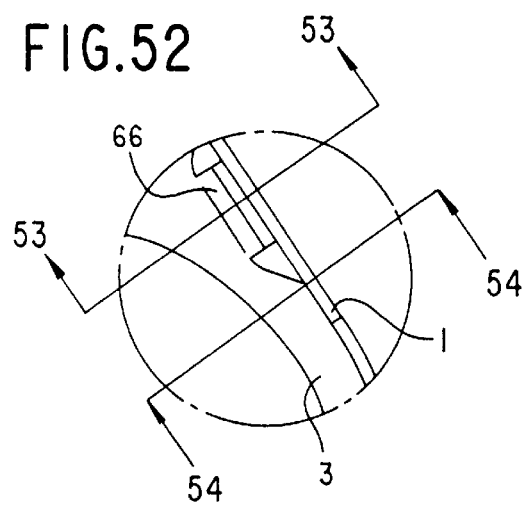
FIG. 52 is an enhanced view of the yet another embodiment of the rib plate assembled with the modified web plate shown in FIG. 47.
Figure 55:
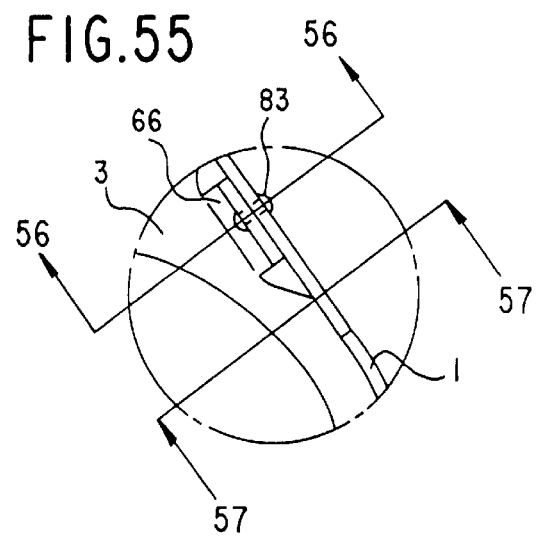
FIG. 55 is an enhanced view of another embodiment of the rib plate assembled with the modified web plate shown in FIG. 47.
Figure 53:
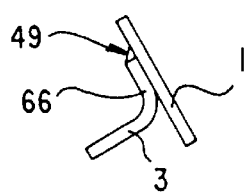
FIG. 53 is a cross-sectional view of the interface between the rib plate and modified web plate illustrated in FIG. 52 taken along section line 53—53.
Figure 56:
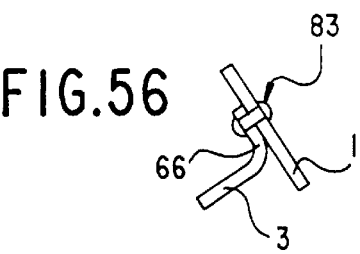
FIG. 56 is a cross-sectional view of the interface between the rib plate and modified web plate illustrated in FIG. 55 taken along section line 56—56.
Figure 54:
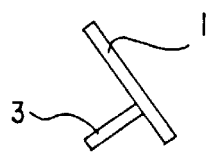
FIG. 54 is a cross-sectional view of the interface between the rib plate and modified web plate illustrated in FIG. 52 taken along section line 54—54.
Figure 57:
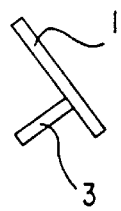
FIG. 57 is a cross-sectional view of the interface between the rib plate and modified web plate illustrated in FIG. 55 taken along section line 57—57.
Figure 58:
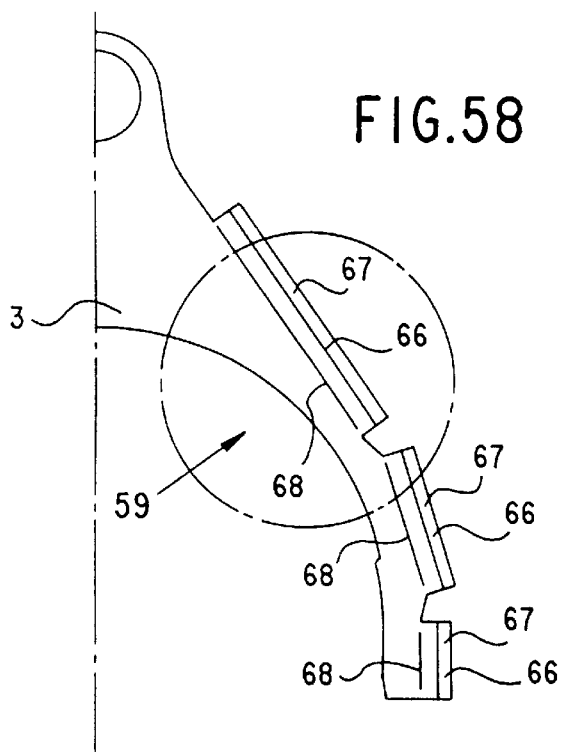
FIG. 58 is a front view of a web plate reinforcement with a bent over rib according to this invention.
Figure 59:
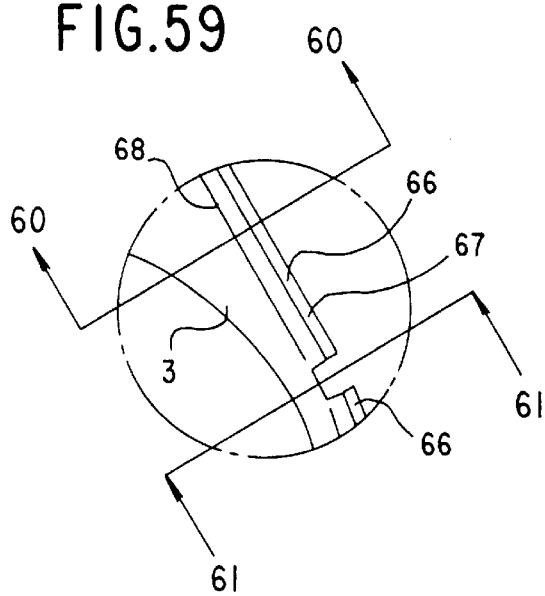
FIG. 59 is an enhanced view of the web plate reinforcement with a bent over rib illustrated in FIG. 58.
Figure 60:
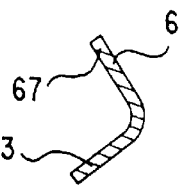
FIG. 60 is a cross-sectional view of the web plate reinforcement with a bent over rib illustrated in FIG. 59 taken along section line 60—60.
Figure 61:
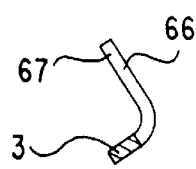
FIG. 61 is a cross-sectional view of the web plate reinforcement with a bent over rib illustrated in FIG. 59 taken along section line 61—61.

Lugs may be produced which are sufficiently long enough to be bent at right angles to the web plate 3 creating a tab 66 as shown in FIGS. 52–54. These tabs 66 can be fastened to the rib plate 1 in a number of ways, as shown in FIGS. 52–57 where welds 49 can be used or rivets 83 can be employed.

As shown in FIG. 12, the shift shaft 2 has a circumferential groove or grooves 6. With an overall width 37 sized to accommodate the rib plate width 38 at the formed area whose radius 28 is generally of the size of half the shift shaft groove diameter 7. This provides abutment faces 42 at either end of the rib plate 1 through which force transfers between the shift shaft 2 and the rib plate 1. Where more than one groove 6 has been produced on the shift shaft 2, the plain portion 44 between grooves 6 may be used to locate the hole in the web plate 35 and hence more accurately locate the web plate throat diameter 25 relative to the shift shaft 2. The rib plate 1 in the region of the shaft, can be of slightly smaller axial extent than the distance between the abutment faces 42. Thus a gap at either or both ends between the plate 1 and the abutments can be filled with plastics such that the transfer of axial forces between the plate and the abutments is indirect. This feature may allow for axial adjustment of the position of the rib plate relative to the shaft.

Figure 16:
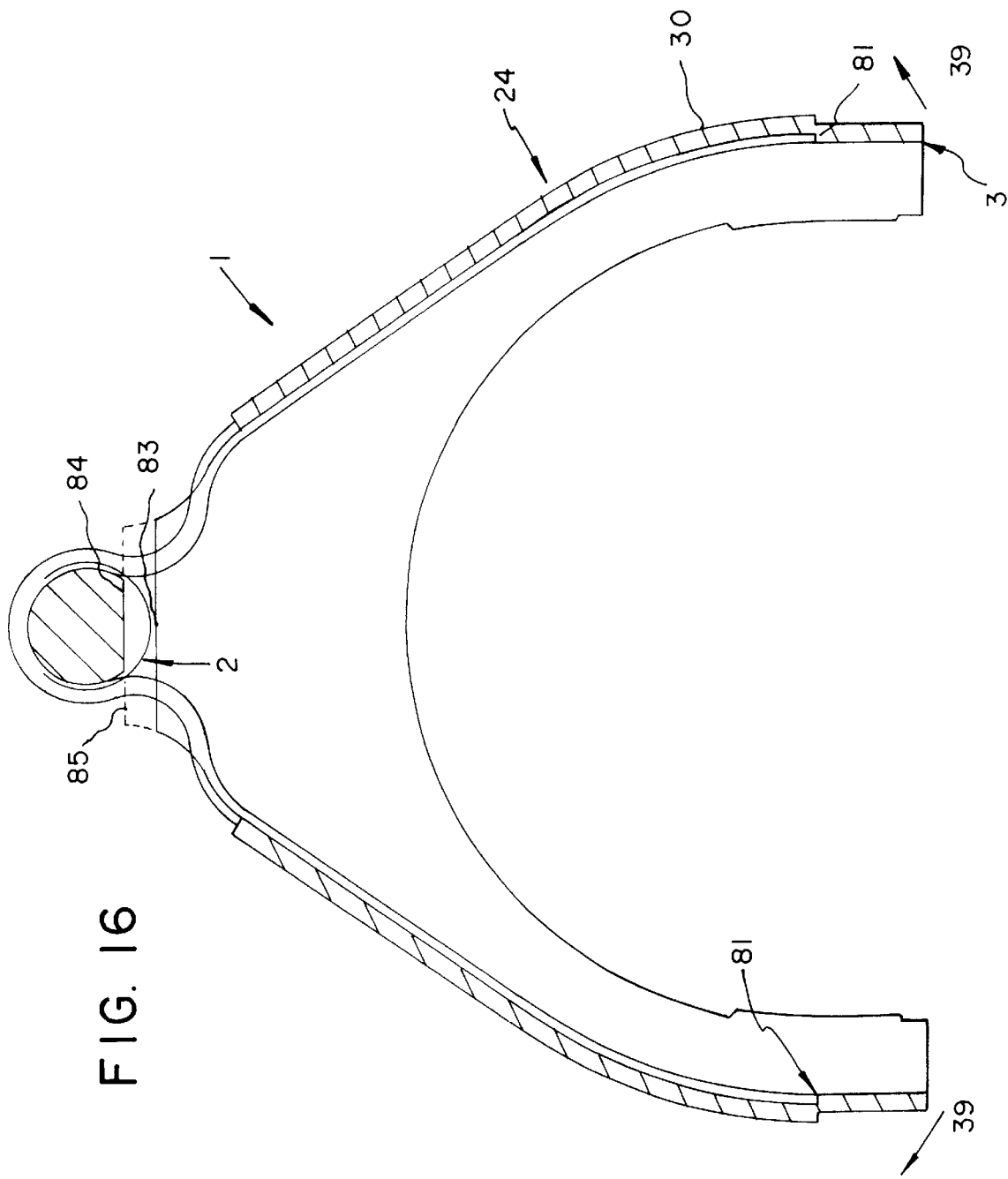
FIG. 16 is an axial sectional view of another embodiment of an assembled rib plate and web plate, on a selector fork according to this invention.
Figure 17:
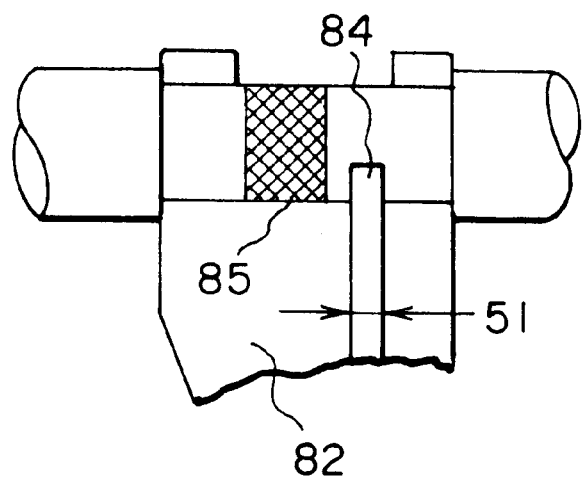
FIG. 17 is a schematic diagram of a sectional view of another embodiment of the assembly shown in FIG. 16.
Figure 18:
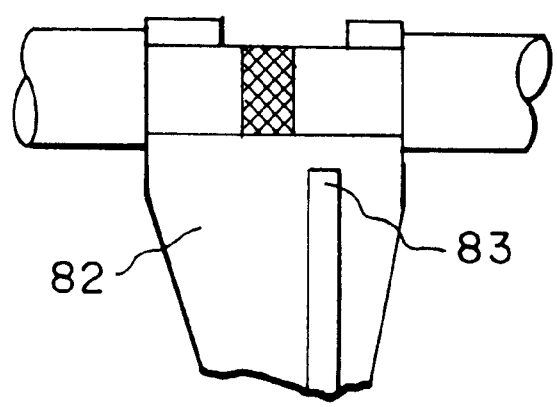
FIG. 18 is a schematic diagram of a sectional view of yet another embodiment of the assembly shown in FIG. 16.

The web plate 3 may be constructed without the circular hole 35, as shown in FIGS. 16–18, where the outer profile 30 has steps 81 at the ends of the legs 24. The unsheared area 82, adjacent to and in line with the groove 9, enables the rib plate 1 to be opened in the direction of arrows 39 in order to restrain the web plate 3 in the groove 9.

The outer profile 30 of the web plate 3 adjacent to the shift shaft 2 may be produced such that it is clear of the shift shaft 2 as shown at 83 and does not partially surround the shift shaft. The shift shaft 2 may be produced with a flatbottomed slot 84 of the same width of the web plate 51, or larger, to enable a web plate 3 with a flat portion 83 to be fitted in the slot 84. This would provide rotational orientation of the shift shaft 2 and the shift fork 14.

The whole assembly may be inserted into a plastic injection moulding tool which injects the plastics 4. The hole in the shaft for the later attachment of the shift block 16 and lug 15 may be used to provide axial location or alternatively a lug on the fork may be used to provide that axial location by placing one of its faces 45 against a stop built into the tool. Rotational orientation may be achieved by stops which abut the inner radius forming the throat diameter 25 of the web plate 3 or placed around the periphery of the rib plate 46 and additional stops against a face of the web plate 47. These stops also provide reaction points necessary to react to high pressures experienced during the injection of plastic into the mould. Alternatively the web plate may have openings through which pins of the mould may extend with the mould clamping opposed sides of those openings. The arrangement locates the fork both radially and axially.

Figure 19:
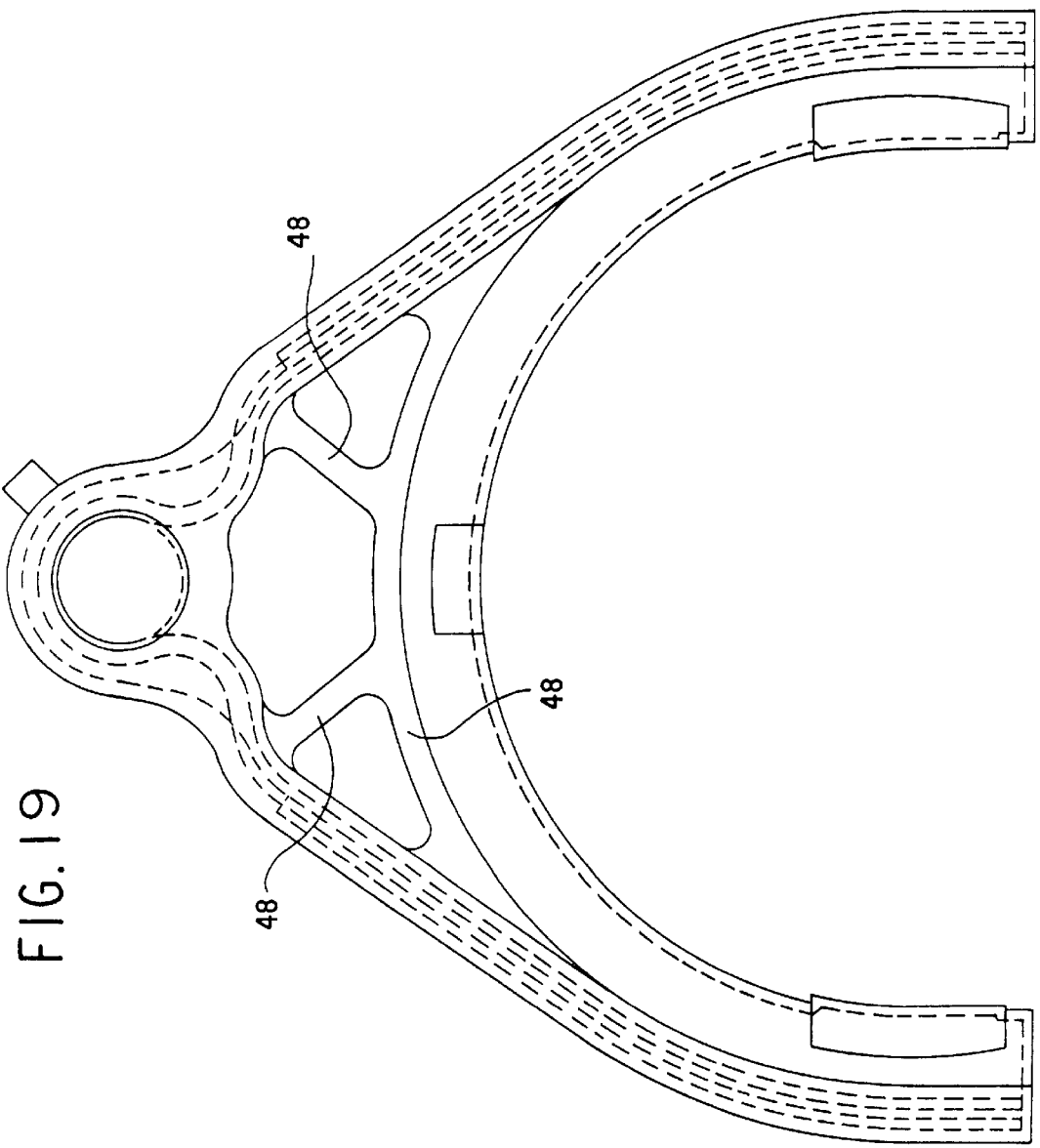
FIG. 19 is an axial view of a selector fork molded over a selector shaft and part of a selector fork according to this invention.
Figure 20:
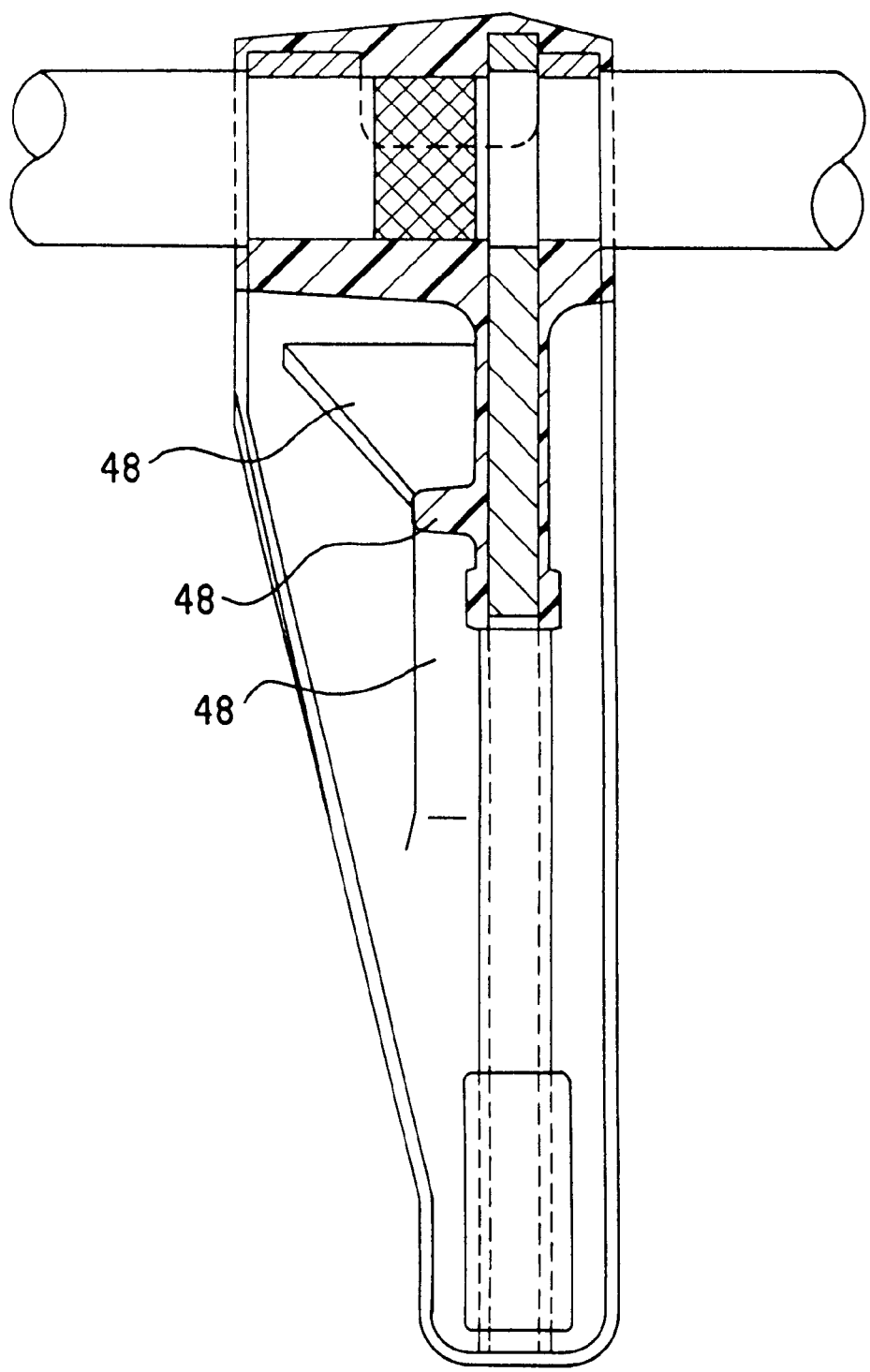
FIG. 20 is a partial cross-sectional side view of a selector fork molded over a selector shaft and part of a selector fork according to this invention.

The injection moulding cavity may be shaped to facilitate extra ribs 48 as shown in FIGS. 19–20. These ribs 48 add strength and restrict distortion, deflection, creep and part shrinkage due to their positioning and construction.

Figure 37:
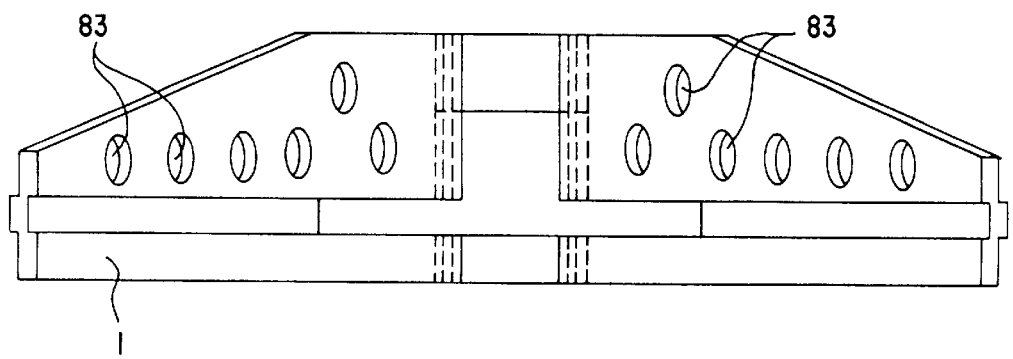
FIG. 37 is a view from beneath a rib plate according to this invention.
Figure 38:
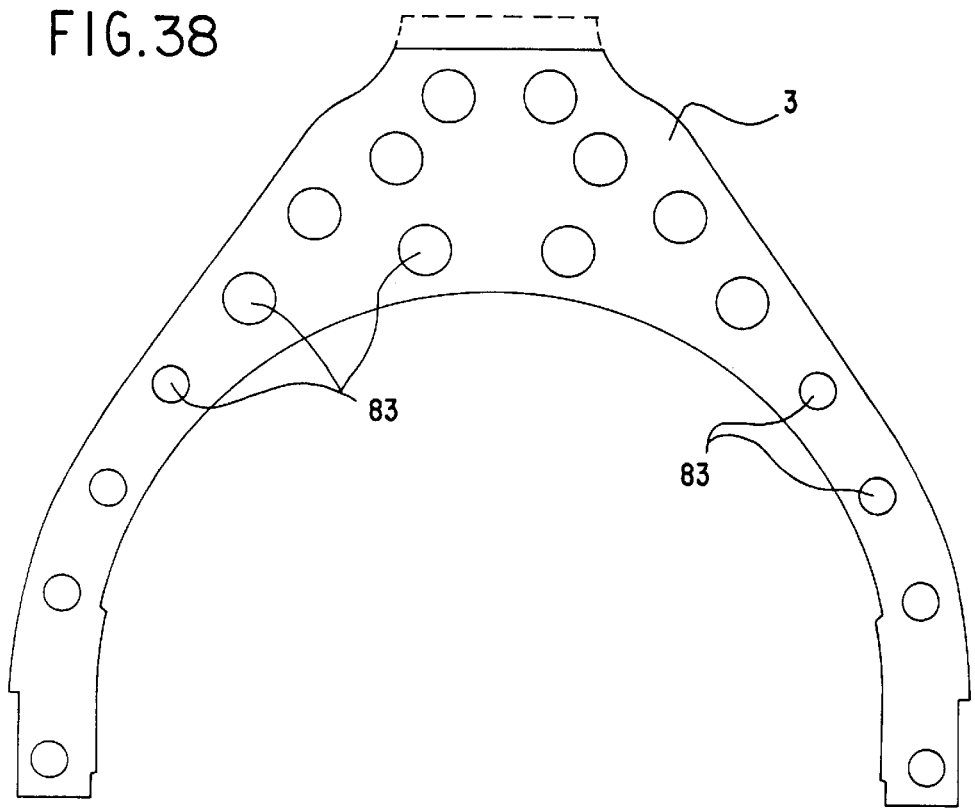
FIG. 38 is a front view of a web plate according to this invention.
Figure 39:
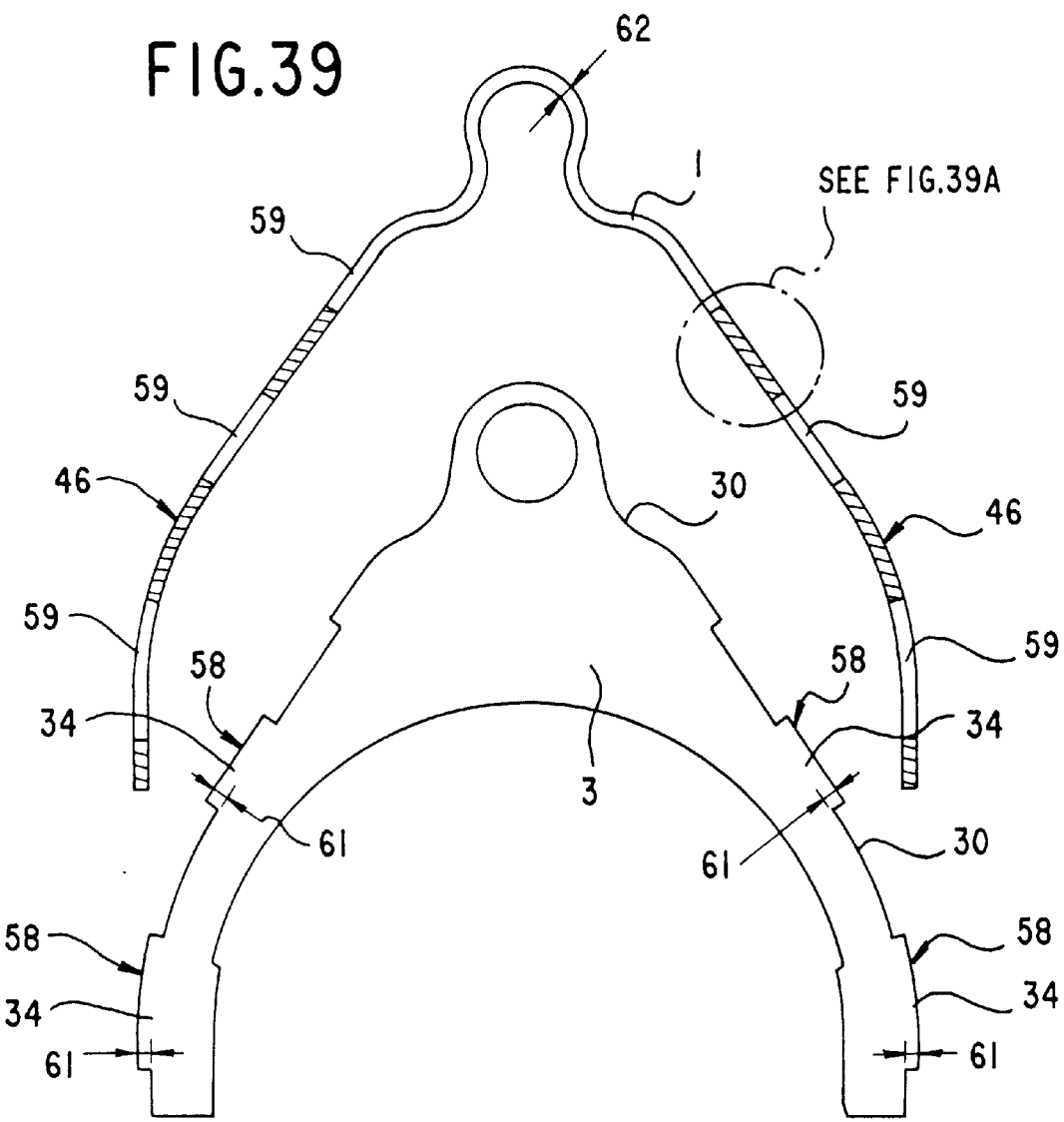
FIG. 39 is an exploded front view illustrating the rib plate assembled with a modified web plate according to this invention.
Figure 39A:
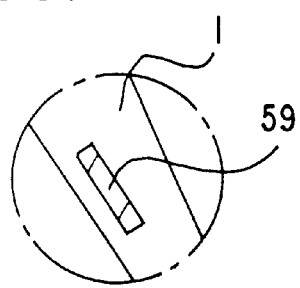
Figure 40:
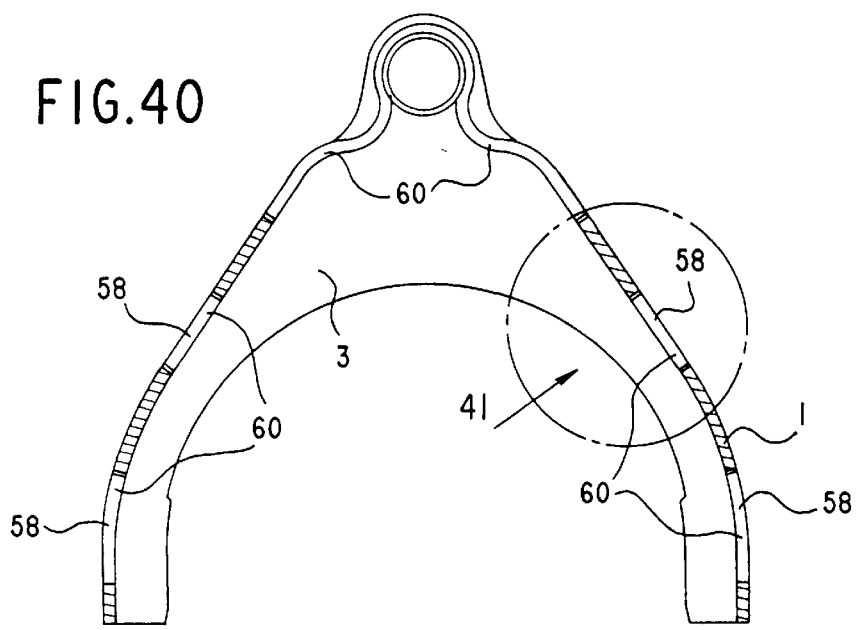
FIG. 40 is a front partial sectional view illustrating the rib plate assembled with the modified web plate according to this invention.
Figure 41:
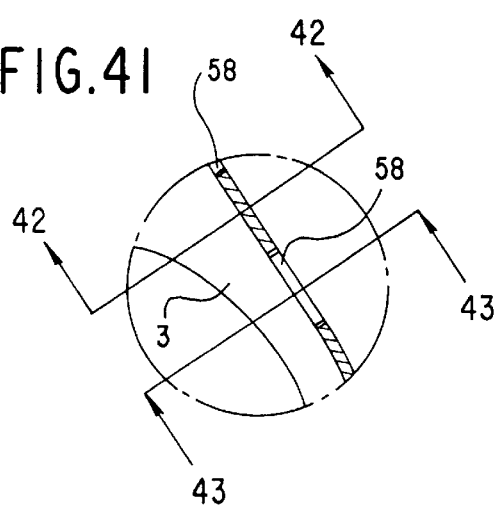
FIG. 41 is an enhanced view of the rib plate assembled with the modified web plate shown in FIG. 40.
Figure 42:
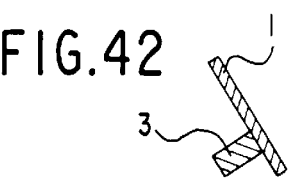
FIG. 42 is a cross-sectional view of the interface between the rib plate and modified web plate illustrated in FIG. 41 taken along section line 42—42.
Figure 43:
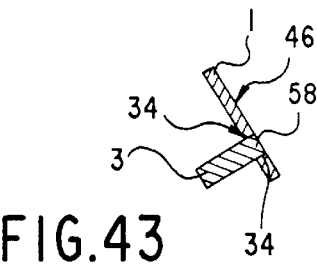
FIG. 43 is a cross-sectional view of the interface between the rib plate and modified web plate illustrated in FIG. 41 taken along section line 43—43.
Figure 44:
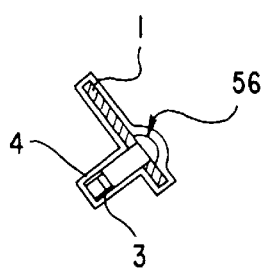
FIG. 44 is a cross-sectional view of an alternate embodiment of the interface between the rib plate and modified web plate illustrated in FIG. 41.
Figure 45:
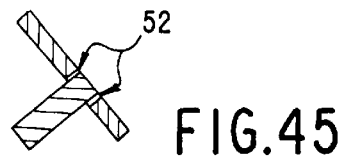
FIG. 45 is a cross-sectional view of an alternate embodiment of the interface between the rib plate and modified web plate illustrated in FIG. 41.
Figure 48:
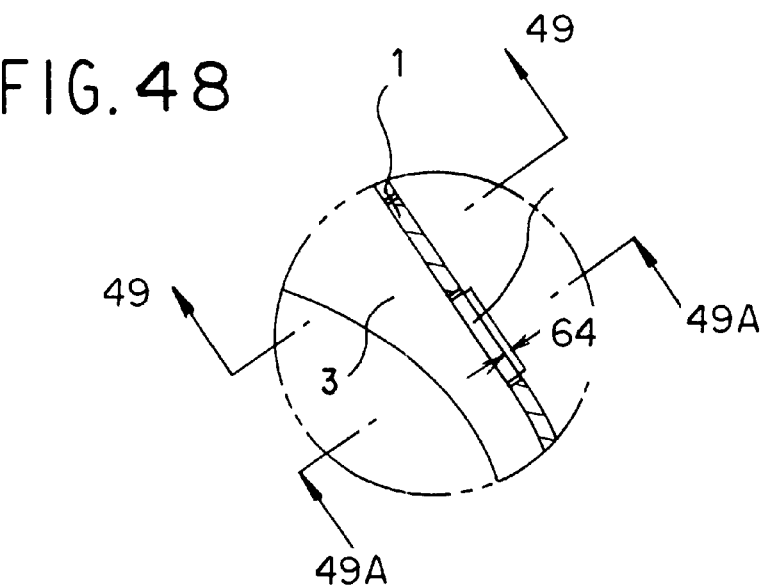
FIG. 48 is an enhanced view of the rib plate assembled with the modified web plate shown in FIG. 46.
Figure 49A:
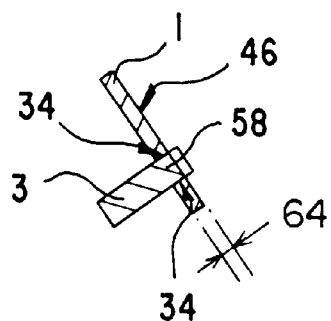
FIG. 49 is a cross-sectional view of the interface between the rib plate and modified web plate illustrated in FIG. 46 taken along section line 49—49.
Figure 49:
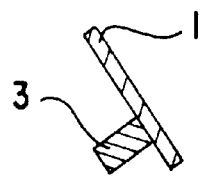

The final product requires no post machining processes except for the trimming off of feeder and flash excesses. The plastic 4 fills the gaps which exist between the metal components and holds the framework together. The plastic 4 resists the possibility of the sprung steel rib plate 1 springing open under load. The web plate 3 and rib plate 1 may be produced with pierced holes 88 in order to provide a means to key and resist peel of the plastic from the otherwise smooth metal surfaces as shown in FIGS. 37–38. These holes (and indeed the openings 53 shown in FIGS. 26–31) can be used to allow the speedy flow of plastics from one side to the other without losing undue heat and without undue weld lines being created. The moulded plastic 4 may also comprise the pads 64–67.

In some of the configurations previously described, the whole of the assembly may not require overmoulding since the framework is held together and can resist loading/deflection. Plastic may be moulded (either separately or with the main moulding) to the ends of the legs 24 to form pads 12 to engage the sleeve. The plastics on each side of the metal components may not necessarily be of the same thickness as the intent is to accurately align the cooperating regions with the sleeve with the gear shift mechanism and by varying the thicknesses of the pad on each side those relative axial distances can be made extremely precise.

The shift fork 14 and shift block 16 may be pinned 18 to the shift shaft 2 as described above, in relation to FIG. 1. Transverse holes 20 perpendicular to the axis 5 of the shift shaft 2, shift fork 14 and shift block 16 may be drilled, through which are inserted roll pins 18. These positional tolerances are important to the quality of final product. However, the use of plastic moulding when the fork and shaft are in their relative positions will reduce the number of tolerances.

The rib plate 1 is restrained within a groove 6 which allows for centreless grinding of the shift shaft 2. The small diameter of the groove 7 may for a portion of its length have a knurl 8 to provide a key for the plastic 4 to restrain the plastic and the assembly to the shaft 2, both axially and rotationally by filling the interrupted surface.

Shown in FIG. 10 a cutout 43 may be used to expose more of the knurl 8.

The shift shaft 2 may be produced without the groove 6 by relying on the rib plate 1 to pinch onto the shaft diameter 36 and coupled with a knurled portion 8, once encapsulated with plastic 4, to hold the fork 14 to the shift shaft 2, as shown in FIGS. 64–65.

The web plate 3 could be made with a flat 71 which mates with a flat bottomed slot 72 in the shaft 2 in order to strengthen and provide a rotational relationship between the shift shaft 2 and the fork 14, as shown in FIG. 12B.

The knurl 8 could stand proud, however, the shaft 2 may need to be brought in pre-ground or would be more costly to grind with ganged grinding wheels.

As shown in FIGS. 68–69, a shift shaft 2 with a portion of an increased diameter 73 offers abutment faces 42 to locate and restrain the two components to each other. The fork 14 could also be secured to the shift shaft through the use of pins 18 (see FIGS. 72–73), screws or rivets 89 (see FIGS. 68–69), or they could be welded or bonded to each other as shown at 49 in FIGS. 74–75.

Figure 82:
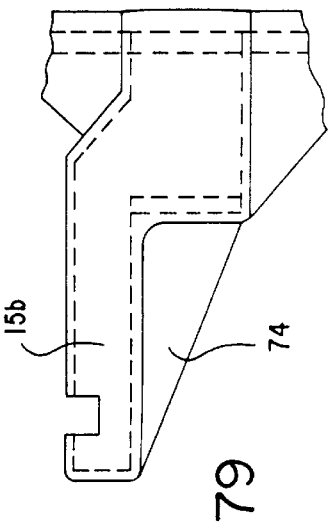
Figure 83:
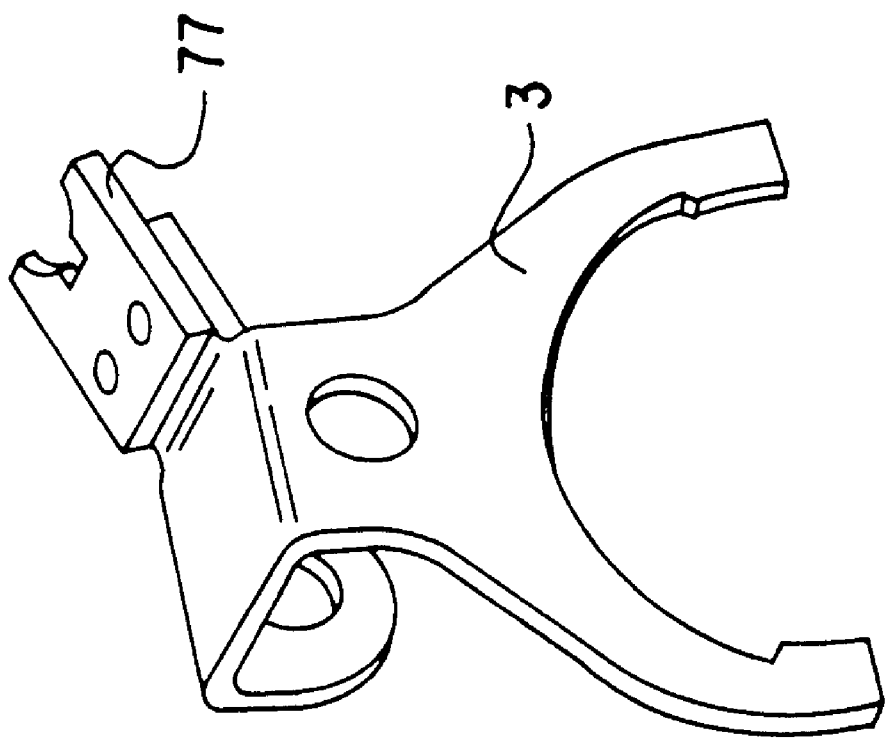
Figure 84:
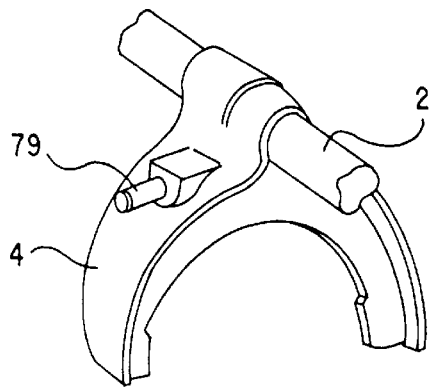
Figure 86:
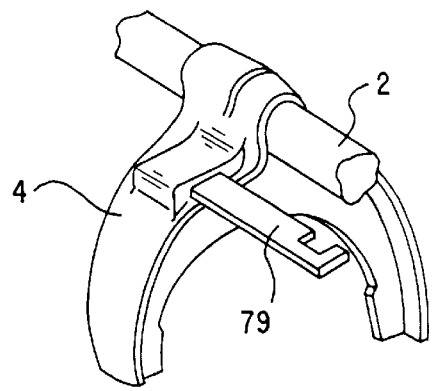
Figure 85:
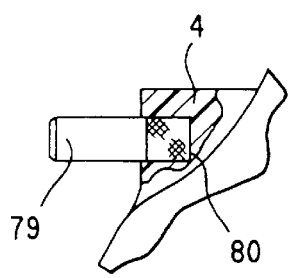
Figure 87:
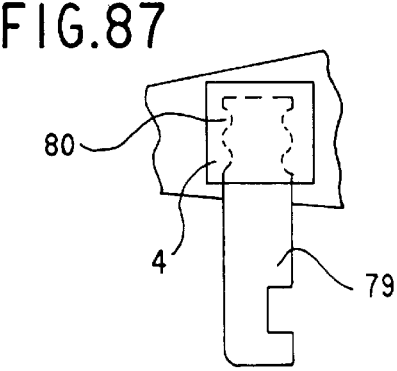

The fork 14 may be adapted to provide an intrinsic lug 15b which is capable of carrying the shifting loads, Plastic support 74 may be used to increase the strength and reduce the effect of deflection. Examples showing the lug 15b located on an extension of the web plate 75 are shown in FIGS. 76–82. As shown in FIG. 82, the lug 15b may be an extension of the rib plate. As shown in FIG. 83, additional material may be fixed to an extension of the rib 77 or web plate 75. The additional piece 79 may be separate from the framework and held by the. plastic material 4, as shown in FIGS. 84–87. Those additional pieces may have an interrupted surface 80 to key the piece to the plastic 4. These pieces may also interact with the framework or the shaft 2.

The fork may comprise a web plate with extra long tabs 66 but no rib plate as shown in FIGS. 58–61. The tabs 66 may be bent with a straight form 68 to act as the ribs 67 of the fork.

Figure 62:
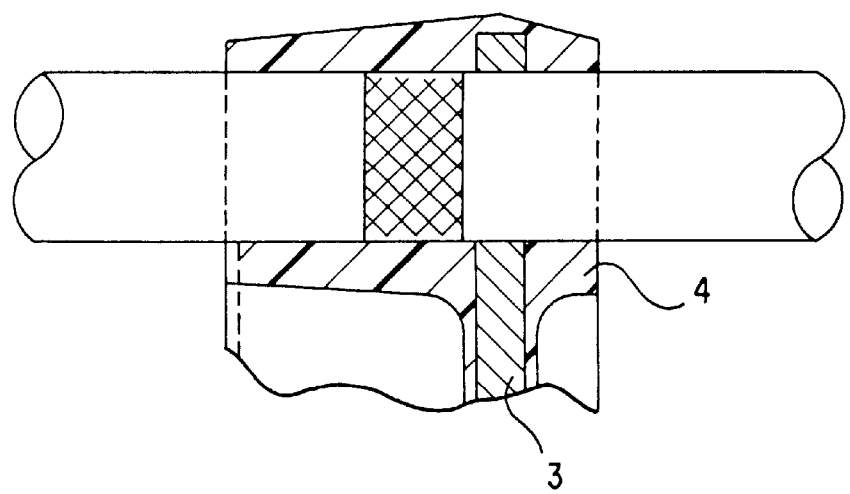
FIG. 62 is a cross-sectional view of a shift shaft and the upper section of a transmission fork for use in low load applications.
Figure 63:
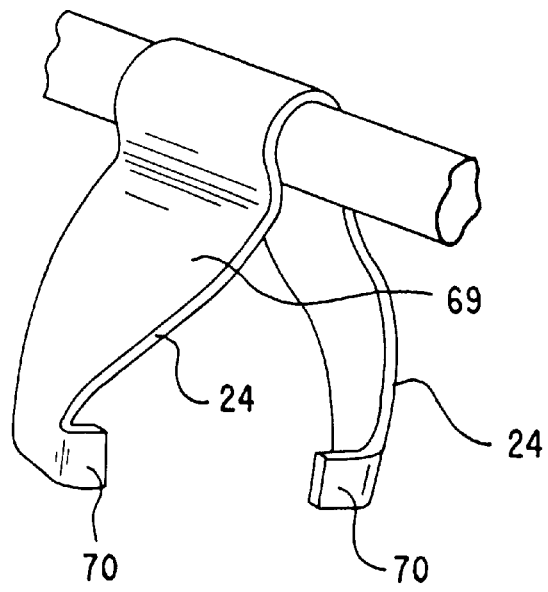
FIG. 63 is a perspective view of a transmission fork comprising a single rib plate.
Figure 76:
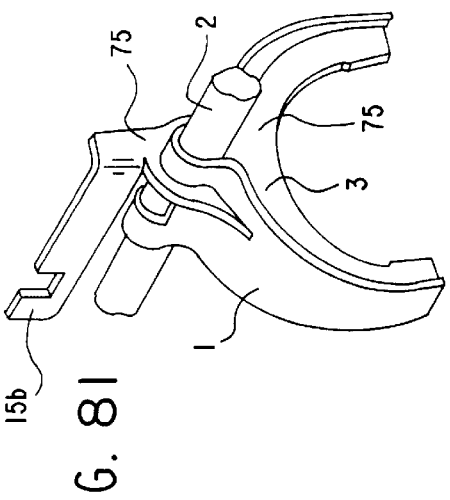
FIGS. 76 to 87 are various sectional views of embodiments of the transmission fork and the lug configuration.
Figure 77:
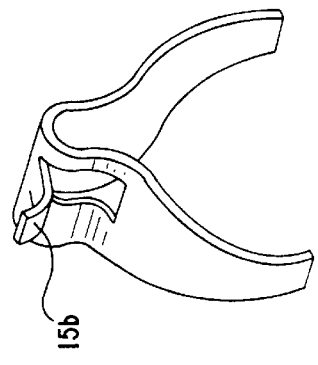
Figure 78:
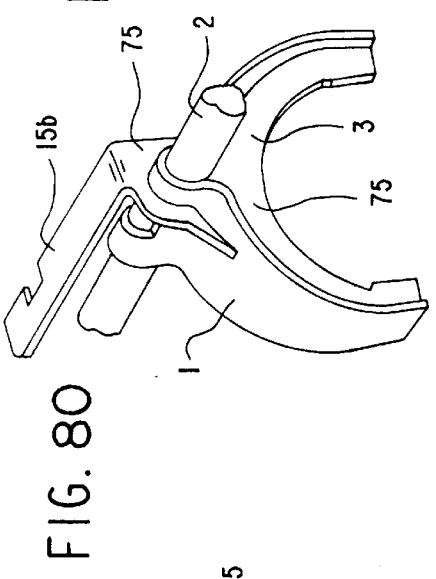
Figure 79:
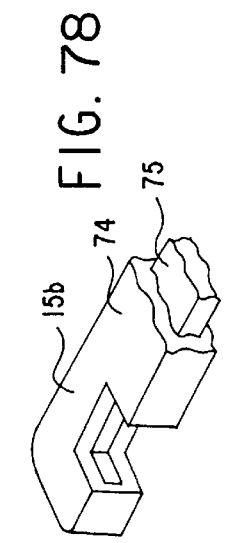
Figure 80:
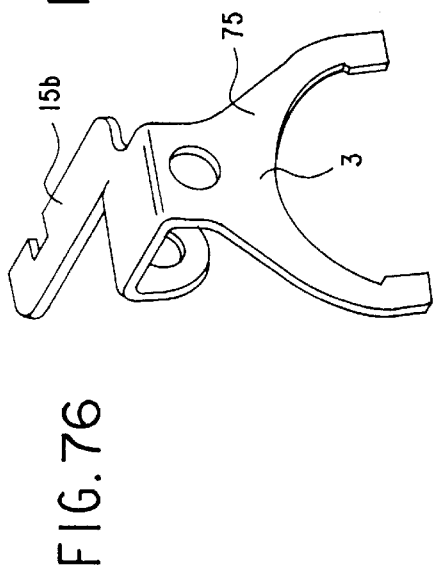
Figure 81:
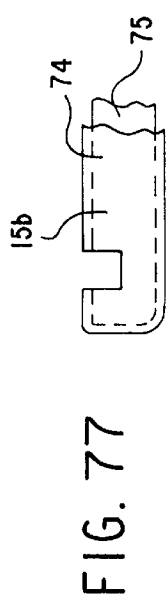

The fork may comprise a plain web plate 3 for use in low load applications, as shown in FIG. 62. Alternatively for low load applications, the fork may comprise a rib plate 69 with folded portions 70 at the ends of the legs 24 providing pads 12 as shown in FIG. 63. The shaft of FIG. 11E is grooved to receive the rib plate 69.

Figure 88:
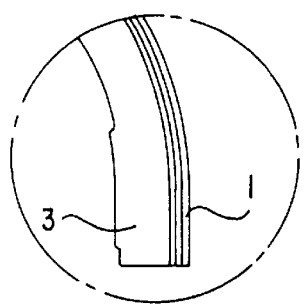
FIG. 88 is a plan view of a leg of a transmission fork comprising a double web plate arrangement with a surrounding plastics layer according to this invention.
Figure 89:
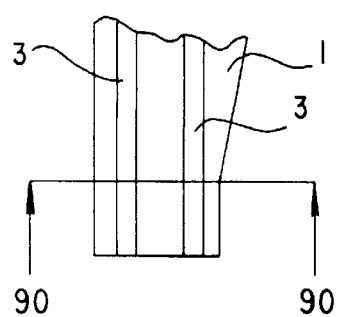
FIG. 89 is an enhanced view of the leg of the transmission fork comprising the double web plate arrangement with the surrounding plastics layer illustrated in FIG. 88.
Figure 90:
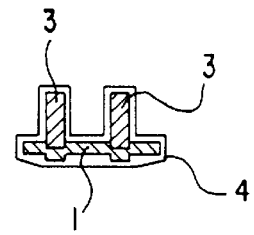
FIG. 90 is a cross-sectional view of the leg of the transmission fork comprising the double web plate arrangement with the surrounding plastics layer illustrated in FIG. 89.

The fork may be a double web plate arrangement as shown in FIGS. 88–90.

Any of the embodiments or methods of manufacture may be combined, as appropriate.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment (s). The invention extends to any novel one, or any novel combination, of the features disclosed in this specification (including any accompanying claims, abstract and drawings), or to any novel one, or any novel combination, of the steps of any method or process so disclosed.

What we claim is:

1. A composite selector fork arrangement adapted to cooperate with a selector shaft to resist rotational and translational movement relative to the selector shaft, the arrangement also being adapted to cooperate with a selector sleeve to effect translational movement of the selector sleeve, the arrangement including a first and second metallic portion defining two independent components, the first metallic portion being arranged to impart stiffness to the fork arrangement in a direction generally in line with the axial extent of the selector shaft and the second metallic portion being arranged to impart stiffness to the fork arrangement in a direction generally transverse to the axial extent of the selector shaft, the arrangement including a non-metallic portion, the non-metallic portion being arranged to at least partially surround the first and second portions, and in which, in use, the non-metallic portion cooperates with the selector shaft to assist in resisting rotational movement of the selector fork arrangement relative to the selector shaft, and in which the non-metallic portion is located in position when the first and second portions are located in their required positions relative to the selector shaft by forming the non-metallic portion when the first and second portions are so located.

2. An arrangement as claimed in claim 1 in which the first and second portions are arranged to cooperate with each other.

3. An arrangement according to claim 1 in which the first portion is adapted to cooperate with the selector shaft and in which the second portion is adapted to cooperate with the selector sleeve.

4. An arrangement according to claim 3, in which the first portion includes a pair of spaced abutments, each of said abutments being arranged to cooperate with the selector shaft to resist relative axial movement in opposed axial directions, the abutments being arranged to be located on opposite sides, in an axial direction relative to the selector shaft, to the second portion.

5. An arrangement according to claim 1 in which the first portion includes a pair of spaced arms at a location away from part of the first portion that are adapted to cooperate with the selector shaft.

6. An arrangement according to claim 5 in which the arms are movable away from each other against a resilient force caused by flexure of the first portion.

7. An arrangement according to claim 1 in which the non-metallic portion includes a flange arranged to increase the stiffness of at least one of the first and second portions.

8. A composite selector fork arrangement adapted to cooperate with a selector shaft to resist rotational and translational movement relative to the selector shaft, the arrangement also being adapted to cooperate with a selector sleeve to effect translational movement of the selector sleeve, the arrangement including a first and second metallic portion defining two independent components, the first metallic portion being arranged to impart stiffness to the fork arrangement in a direction generally in line with the axial extent of the selector shaft and the second metallic portion being arranged to impart stiffness to the fork arrangement in a direction generally transverse to the axial extent of the selector shaft, the first portion including a pair of spaced arms, said spaced arms being at a location away from part of the first portion and said spaced arms being adapted to cooperate with the selector shaft, the arms being movable away from each other against a resilient force caused by flexure of the first portion, with the movement of the spaced arms of the first portion away from each other being arranged to assist in the location and engagement of the first portion with the second portion by subsequently causing or allowing those arms to move back towards each other.

9. An arrangement as claimed in claim 8 in which the first and second portions are arranged to cooperate with each other.

10. An arrangement according to claim 8 in which the first portion is adapted to cooperate with the selector shaft and in which the second portion is adapted to cooperate with the selector sleeve.

11. An arrangement according to claim 8, in which the first portion includes a pair of spaced abutments, each of said abutments being arranged to cooperate with the selector shaft to resist relative axial movement in opposed axial directions, the abutments being arranged to be located on opposite sides, in an axial direction relative to the selector shaft, to the second portion.

12. An arrangement according to claim 8 including a nonmetallic portion, the non-metallic portion is arranged to at least partially surround the first and second portions.

13. An arrangement according to claim 12 in which, in use, the non-metallic portion cooperates with the selector shaft to assist in resisting rotational movement of the selector fork arrangement relative to the selector shaft.

14. A composite selector fork arrangement adapted to cooperate with a selector shaft to resist rotational and translational movement relative to the selector shaft, the arrangement also being adapted to cooperate with a selector sleeve to effect translational movement of the selector sleeve, the arrangement including a first and second metallic portion defining two independent components, the first metallic portion being arranged to impart stiffness to the fork arrangement in a direction generally in line with the axial extent of the selector shaft and the second metallic portion being arranged to impart stiffness to the fork arrangement in a direction generally transverse to the axial extent of the selector shaft, the first portion including a pair of spaced arms, said spaced arms being at a location away from part of the first portion and said spaced arms being adapted to cooperate with the selector shaft, the arms being movable away from each other against a resilient force caused by flexure of the first portion, the movement of the pair of spaced arms of the first portion allowing the first portion to be moved into a position to cooperate with the selector shaft by relative movement of the first portion to the selector shaft.

15. An arrangement as claimed in claim 14 in which the first and second portions are arranged to cooperate with each other.

16. An arrangement according to claim 14 in which the first portion is adapted to cooperate with the selector shaft and in which the second portion is adapted to cooperate with the selector sleeve.

17. An arrangement according to claim 14, in which the first portion includes a pair of spaced abutments, each of said abutments being arranged to cooperate with the selector shaft to resist relative axial movement in opposed axial directions, the abutments being arranged to be located on opposite sides, in an axial direction relative to the selector shaft, to the second portion.

\* \* \* \* \*